US010723819B2

(12) United States Patent
Holtcamp et al.

(10) Patent No.: US 10,723,819 B2
(45) Date of Patent: Jul. 28, 2020

(54) SUPPORTED CATALYST SYSTEMS AND PROCESSES FOR USE THEREOF

(71) Applicant: ExxonMobil Chemical Patents Inc., Baytown, TX (US)

(72) Inventors: Matthew W. Holtcamp, Huffman, TX (US); Donna J. Crowther, Blairsville, GA (US); Subramaniam Kuppuswamy, Mont Belvieu, TX (US); Matthew S. Bedoya, Humble, TX (US); Laughlin G. McCullough, League City, TX (US); Ching-Tai Lue, Sugarland, TX (US); David M. Fiscus, Houston, TX (US)

(73) Assignee: ExxonMobil Chemical Patents, Inc., Baytown, TX (US)

( * ) Notice: Subject to any disclaimer, the term of this patent is extended or adjusted under 35 U.S.C. 154(b) by 0 days.

(21) Appl. No.: 15/877,094

(22) Filed: Jan. 22, 2018

(65) Prior Publication Data
US 2018/0237554 A1 Aug. 23, 2018

Related U.S. Application Data

(60) Provisional application No. 62/461,104, filed on Feb. 20, 2017.

(51) Int. Cl.
C08F 4/653 (2006.01)
C08F 4/6592 (2006.01)
C08F 210/16 (2006.01)
C08L 23/08 (2006.01)
C08F 2/34 (2006.01)
C08F 10/02 (2006.01)
C08F 2/18 (2006.01)
C08F 4/659 (2006.01)

(52) U.S. Cl.
CPC ............ C08F 4/65927 (2013.01); C08F 2/18 (2013.01); C08F 2/34 (2013.01); C08F 10/02 (2013.01); C08F 210/16 (2013.01); C08L 23/0815 (2013.01); C08F 4/65912 (2013.01); C08F 4/65916 (2013.01); C08F 4/65925 (2013.01)

(58) Field of Classification Search
CPC .............. C08F 4/65904; C08F 4/65916; C08F 4/65926; C08F 4/65925; C08F 210/16
See application file for complete search history.

(56) References Cited

U.S. PATENT DOCUMENTS

| 4,701,432 | A | 10/1987 | Welborn, Jr. |
| 5,032,562 | A | 7/1991 | Lo et al. |
| 5,077,255 | A | 12/1991 | Welborn, Jr. |
| 5,135,526 | A | 8/1992 | Zinnanti et al. |
| 5,183,867 | A | 2/1993 | Welborn, Jr. |
| 5,382,630 | A | 1/1995 | Stehling et al. |
| 5,382,631 | A | 1/1995 | Stehling et al. |
| 5,516,848 | A | 5/1996 | Canich et al. |
| 5,525,678 | A | 6/1996 | Mink et al. |
| 6,069,213 | A | 5/2000 | Nemzek et al. |
| 6,207,606 | B1 | 3/2001 | Lue et al. |
| 6,656,866 | B2 | 12/2003 | Wenzel et al. |
| 6,828,394 | B2 | 12/2004 | Vaughan et al. |
| 6,956,094 | B2 | 10/2005 | Mawson et al. |
| 6,964,937 | B2 | 11/2005 | Mink et al. |
| 6,995,109 | B2 | 2/2006 | Mink et al. |
| 7,041,617 | B2 | 5/2006 | Jensen et al. |
| 7,119,153 | B2 | 10/2006 | Jensen et al. |
| 7,129,302 | B2 | 10/2006 | Mink et al. |
| 7,141,632 | B2 | 11/2006 | Vaughan et al. |
| 7,172,987 | B2 | 2/2007 | Kao et al. |
| 7,179,876 | B2 | 2/2007 | Szul et al. |
| 7,192,902 | B2 | 3/2007 | Brinen et al. |
| 7,199,072 | B2 | 4/2007 | Crowther et al. |
| 7,199,073 | B2 | 4/2007 | Martin et al. |
| 7,226,886 | B2 | 6/2007 | Jayaratne et al. |
| 7,285,608 | B2 | 10/2007 | Schottek et al. |
| 7,294,681 | B2 | 11/2007 | Jiang et al. |
| 7,355,058 | B2 | 4/2008 | Luo et al. |
| 7,385,015 | B2 | 6/2008 | Holtcamp |
| 7,396,888 | B2 | 7/2008 | Razavi |
| 7,595,364 | B2 | 9/2009 | Shannon et al. |
| 7,619,047 | B2 | 11/2009 | Yang et al. |
| 7,662,894 | B2 | 2/2010 | Hamed et al. |
| 7,829,495 | B2 | 11/2010 | Floyd et al. |
| 7,855,253 | B2 | 12/2010 | Shannon et al. |

(Continued)

FOREIGN PATENT DOCUMENTS

EP 0705851 A 4/1996
EP 0729387 B1 9/1999

(Continued)

OTHER PUBLICATIONS

Stadelhofer et al., "Darstellung und eigenschaften von alkylmetallcyclopentadienderivativen des aluminiums, galliums und indiums", J. Organomet. Chem., 1975, vol. 84, pp. C1-C4.
U.S. Appl. No. 62/461,110, filed Feb. 20, 2017.
U.S. Appl. No. 15/852,553, filed Dec. 22, 2017.
PCT/US2016/021748, Mar. 10, 2016, ExxonMobil Chemical Patents Inc.
PCT/US2016/021757, Mar. 3, 2016, ExxonMobil Chemical Patents Inc.
Chen et al., (2014) "Modeling and Simulation of Borstar Bimodal Polyethylene Process Based on Rigorous PC-SAFT Equation of State Model", Industrial & Engineering Chemical Research, 53, pp. 19905-19915.

(Continued)

Primary Examiner — Caixia Lu
(74) Attorney, Agent, or Firm — ExxonMobil Chemical Patents, Inc-Law Department

(57) ABSTRACT

This invention relates to a supported catalyst system and process for use thereof. In particular, the catalyst system includes bridged hafnium metallocene compound, an unbridged metallocene compound, a support material and an activator. The catalyst system may be used for preparing polyolefins.

23 Claims, 4 Drawing Sheets

(56) References Cited

U.S. PATENT DOCUMENTS

| | | |
|---|---|---|
| 8,088,867 B2 | 1/2012 | Jiang et al. |
| 8,110,518 B2 | 2/2012 | Marin et al. |
| 8,138,113 B2 | 3/2012 | Yang et al. |
| 8,288,487 B2 | 10/2012 | Yang et al. |
| 8,268,944 B2 | 11/2012 | Yang et al. |
| 8,329,834 B2 | 12/2012 | Masino et al. |
| 8,378,029 B2 | 2/2013 | Liu et al. |
| 8,575,284 B2 | 11/2013 | Luo et al. |
| 8,598,061 B2 | 12/2013 | Yang et al. |
| 8,680,218 B1 | 3/2014 | Yang et al. |
| 8,785,551 B2 | 7/2014 | Arriola et al. |
| 8,815,357 B1 | 8/2014 | Inn et al. |
| 8,940,842 B2 | 1/2015 | Yang et al. |
| 8,957,168 B1 | 2/2015 | Yang et al. |
| 9,079,993 B1 | 7/2015 | St. Jean et al. |
| 9,163,098 B2 | 10/2015 | McDaniel et al. |
| 9,181,370 B2 | 11/2015 | Sukhadia et al. |
| 9,303,099 B2 | 4/2016 | Yang et al. |
| 2004/0259722 A1 | 12/2004 | Wang |
| 2006/0275571 A1 | 12/2006 | Mure et al. |
| 2007/0043176 A1 | 2/2007 | Martin et al. |
| 2010/0331505 A1 | 12/2010 | Masino et al. |
| 2012/0130032 A1 | 5/2012 | Hussein et al. |
| 2014/0031504 A1 | 1/2014 | Jacobsen et al. |
| 2014/0127427 A1 | 5/2014 | Vantomme et al. |
| 2014/0242314 A1 | 8/2014 | Inn et al. |
| 2015/0299352 A1 | 10/2015 | Sohn et al. |
| 2015/0368377 A1* | 12/2015 | Lester .................. C08F 4/02 526/170 |
| 2016/0032027 A1 | 2/2016 | St. Jean et al. |
| 2016/0075803 A1 | 3/2016 | St. Jean et al. |

FOREIGN PATENT DOCUMENTS

| | | |
|---|---|---|
| EP | 0676418 B1 | 7/2000 |
| EP | 2003166 | 12/2008 |
| EP | 2374822 B1 | 10/2014 |
| KR | 101132180 B | 4/2012 |
| KR | 20150058020 A | 5/2015 |
| WO | WO 1997/35891 | 10/1997 |
| WO | WO 1998/49209 | 11/1998 |
| WO | WO 1999/60032 | 11/1999 |
| WO | WO 2000/12565 | 3/2000 |
| WO | 01/09200 A | 2/2001 |
| WO | WO 2002/060957 | 8/2002 |
| WO | WO 2005/068519 | 7/2005 |
| WO | 2006/080817 A | 8/2006 |
| WO | WO 2007/067259 | 6/2007 |
| WO | WO 2007/080365 | 7/2007 |
| WO | WO 2009/146167 | 12/2009 |
| WO | WO 2012/006272 | 1/2012 |
| WO | WO 2012/158260 | 11/2012 |
| WO | 2015/123168 A | 8/2015 |
| WO | 2016/168479 A | 10/2016 |
| WO | 2016/171807 A | 10/2016 |
| WO | 2016/172099 A | 10/2016 |
| WO | WO 2016/168479 | 10/2016 |
| WO | WO 2016/171807 | 10/2016 |

OTHER PUBLICATIONS

Hong et al. (2007) "Immobilized Me2Si(C5Me4)(N-t-Bu)TiCl2/(nBuCp)2ZrCl2 Hybrid Metallocene Catalyst System for the Production of Poly(ethylene-co-hexene) with Psuedo-bimodal Molecular Weight and Inverse Comonomer Distribution", Polymer Engineering and Science-2007, Doi 10.1002/pen, pp. 131-139 published online in Wiley InterScience (www.interscience.wiley.com) 2007 Society of Plastics Engineers.

Iedema, P.D., et al. (2004) "Predicting the Molecular Weight Distribution of Polyethylene for Mixed Systems with a Constrained-Geometry Metallocene Catalyst in a Semibatch Reactor", Dept. of Chemical Engineering, Universiteit van Amsterdam, The Netherlands, American Chemical Society, Ind. Eng. Chem. Res., vol. 43, pp. 36-50.

Kim, J.D., et al., (2000) "Copolymerization of Ethylene and Alpha-Olefins with Combined Metallocene Catalysts. III. Production of Polyolefins with Controlled Microstructure", Institute for Polymer Research, Department of Chemical Engineering, University of Waterloo, Ontario, Canada; Journal of Polymer Science, Part A: Polymer Chemistry, vol. 38, pp. 1427-1432.

Leino, R., et al (2001), "Syndiospecific Propylene Polymerization with $C^1$ Symmetric Group 4 ansa-Metallocene Catalysts", Dept of Chemistry, Stanford University, CA, Macromolecules, vol. 34, pp. 2072-2082.

Sheu, S., (2006), "Enhanced bimodal PE makes the impossible possible", Borouge reference line 2006; Borouge Pte Ltd, Oct. 2006, Shanghai http://www.tappi.org/content/06asiaplace/pdfs-english/enhanced.pdf.

* cited by examiner

SUPPORTED CATALYST SYSTEMS AND PROCESSES FOR USE THEREOF

CROSS-REFERENCE OF RELATED APPLICATIONS

This application claims priority to and the benefit of 62/461,104, filed on Feb. 20, 2017, and is incorporated by reference in its entirety.

This application relates to concurrently filed application having U.S. application Ser. No. 15/852,553, entitled "Hafnocene Catalyst Compounds and Process for Use Thereof". This application also relates to concurrently filed application having U.S. application Ser. No. 15/877,143), entitled "Group 4 Catalyst Compounds and Process for Use Thereof".

FIELD OF INVENTION

This invention relates to a supported catalyst system and process for use thereof. In particular, the catalyst system comprises a bridged group 4 metallocene compound, an unbridged group 4 metallocene compound, a support material and, optionally, an activator. The catalyst system may be used for olefin polymerization processes.

BACKGROUND OF INVENTION

Olefin polymerization catalysts are of great use in industry. Hence, there is interest in finding new catalyst systems that increase the commercial usefulness of the catalyst and allow the production of polymers having improved properties. Catalysts for olefin polymerization are often based on cyclopentadienyl transition metal compounds as catalyst precursors combined with activators, typically an alumoxane or with an activator containing a non-coordinating anion.

A typical metallocene catalyst system includes metallocene catalyst, activator, and optional support. Supported catalyst systems are used in many polymerization processes, often in slurry or gas phase polymerization processes.

Catalysts for olefin polymerization are often based on substituted metallocenes as catalyst precursors, which are activated either with the help of an alumoxane, or with an activator containing a non-coordinating anion.

For example U.S. Pat. No. 7,829,495 discloses $Me_2Si$ (fluorenyl)(3-nPr-Cp)$ZrCl_2$ and U.S. Pat. No. 7,179,876 discloses supported (nPrCp)$_2HfMe_2$.

Further, Stadelhofer, J.; Weidlein, J.; Haaland, A. *J. Organomet. Chem.* 1975, 84, C1-C4 discloses preparation of potassium cyclopentadienide.

Additionally, $Me_2C(Cp)(Me_3SiCH_2$-Ind)$MCl_2$ and $Me_2C$(Cp)(Me, $Me_3SiCH_2$-Ind)$MCl_2$, where M is Zr or Hf have been synthesized and screened for the syndiospecific polymerization of propylene; see Leino, R, Gomez, F.; Cole, A.; Waymouth, R. *Macromolecules* 2001, 34, 2072-2082.

Metallocenes are often combined with other catalysts, or even other metallocenes, to attempt to modify polymer properties. See, for example, U.S. Pat. Nos. 8,088,867 and 5,516,848 (which discloses the use of two different cyclopentadienyl based transition metal compounds activated with alumoxane or non-coordinating anions). See also PCT/US2016/021748, filed Mar. 10, 2016, which discloses two metallocenes used to make ethylene copolymers.

Likewise, $Me_2C(Cp)(Me_3SiCH_2$-Ind)$MCl_2$ and $Me_2C$(Cp)(Me, $Me_3SiCH_2$-Ind)$MCl_2$, where M is Zr or Hf have been synthesized and screened for the syndiospecific polymerization of propylene; see Leino, R., Gomez, F.; Cole, A.; Waymouth, R. *Macromolecules* 2001, 34, 2072-2082.

Additional references of interest include: Hong et al. in Immobilized $Me_2Si(C_5Me_4)$(N-t-Bu)$TiCl_2$/(nBuCp)$_2ZrCl_2$ Hybrid Metallocene Catalyst System for the Production of Poly(ethylene-co-hexene) with Psuedo-bimodal Molecular Weight and Inverse Comonomer Distribution, (Polymer Engineering and Science-2007, DOI 10.1002/pen, pages 131-139, published online in Wiley InterScience (www.interscience.wiley.com) 2007 Society of Plastics Engineers); Kim, J. D. et al., J. Polym. Sci. Part A: Polym Chem., 38, 1427 (2000); Iedema, P. D. et al., Ind. Eng. Chem. Res., 43, 36 (2004); U.S. Pat. Nos. 4,701,432; 5,032,562; 5,077,255; 5,135,526; 5,183,867; 5,382,630; 5,382,631; 5,525,678; 6,069,213; 6,207,606; 6,656,866; 6,828,394; 6,964,937; 6,956,094; 6,964,937; 6,995,109; 7,041,617; 7,119,153; 7,129,302; 7,141,632; 7,172,987; 7,179,876; 7,192,902; 7,199,072; 7,199,073; 7,226,886; 7,285,608; 7,355,058; 7,385,015; 7,396,888; 7,595,364; 7,619,047; 7,662,894; 7,829,495; 7,855,253; 8,110,518; 8,138,113; 8,268,944; 8,288,487; 8,329,834; 8,378,029; 8,575,284; 8,598,061; 8,680,218; 8,785,551; 8,815,357; 8,940,842; 8,957,168; 9,079,993; 9,163,098; 9,181,370; 9,303,099; U.S. Publications 2004/259722; 2006/275571; 2007/043176; 2010/331505; 2012/0130032; 2014/0031504; 2014/0127427; 2015/299352; 2016/0032027; 2016/075803; PCT Publications WO 97/35891; WO 98/49209; WO 00/12565; WO 2001/09200; WO 02/060957; WO 2004/046214; WO 2006/080817; WO 2007/067259; WO 2007/080365; WO 2009/146167; WO 2012/006272; WO 2012/158260; WO 2014/0242314; WO 2015/123168; WO 2016/172099; PCT Application No. PCT/US2016/021757, filed Mar. 10, 2016; EP 2 374 822; EP 2 003 166; EP 0,729,387; EP 0,676,418; EP 0 705 851; KR 20150058020; KR 101132180; Sheu, S., 2006, "Enhanced bimodal PE makes the impossible possible", http://www.tappi.org/content/06asiaplace/pdfs-english/enhanced.pdf; and Chen et al., "Modeling and Simulation of Borstar Bimodal Polyethylene Process Based on Rigorous PC-SAFT Equation of State Model", Industrial & Engineering Chemical Research, 53, pp. 19905-19915, (2014).

There is still a need in the art for new and improved catalyst systems for the polymerization of olefins, in order to achieve increased activity or enhanced polymer properties, to increase conversion or comonomer incorporation, or to alter comonomer distribution.

It is also an object of the present invention to provide novel supported catalysts systems and processes for the polymerization of olefins (such as ethylene) using such catalyst systems.

It is also an object of the present invention to provide ethylene polymers having the unique properties of high stiffness, high toughness and good processability.

SUMMARY OF INVENTION

This invention relates to a supported catalyst system comprising: (i) at least one first catalyst component comprising a bridged group 4 (zirconium or hafnium) metallocene compound having a substitution at the three position on the cyclopentadienyl ring; (ii) at least one second catalyst component comprising an unbridged group 4 (zirconium or hafnium) metallocene compound; (iii) activator; and (iv) a support; wherein the bridged hafnium metallocene is represented by the formula (A):

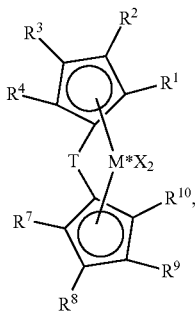

(A)

where:
M* is a group 4 metal, such as Zr or Hf;
each $R^1$, $R^2$, and $R^4$ is independently hydrogen, alkoxide or a $C_1$ to $C_{40}$ substituted or unsubstituted hydrocarbyl group;
$R^3$ is independently hydrogen, alkoxide or a $C_1$ to $C_{40}$ substituted or unsubstituted hydrocarbyl group or is —$R^{20}$—SiR'$_3$ or —$R^{20}$—CR'$_3$ where $R^{20}$ is hydrogen, or a $C_1$ to $C_4$ hydrocarbyl, and each R' is independently a $C_1$ to $C_{20}$ substituted or unsubstituted hydrocarbyl, provided that at least one R' is not H;
each $R^7$, $R^8$, and $R^{10}$ is independently hydrogen, alkoxide or a $C_1$ to $C_{40}$ substituted or unsubstituted hydrocarbyl group;
$R^9$ is —$R^{20}$—SiR'$_3$ or —$R^{20}$—CR'$_3$ where $R^{20}$ is hydrogen, or a $C_1$ to $C_4$ hydrocarbyl, and
each R' is independently a $C_1$ to $C_{20}$ substituted or unsubstituted hydrocarbyl, provided that at least one R' is not H;
T is a bridging group; and
each X is, independently, a univalent anionic ligand, or two X are joined and bound to the metal atom to form a metallocycle ring, or two X are joined to form a chelating ligand, a diene ligand, or an alkylidene ligand.
each $R^1$, $R^2$, $R^3$, and $R^4$ is independently hydrogen, alkoxide or a $C_1$ to $C_{40}$ substituted or unsubstituted hydrocarbyl group;
each $R^7$, $R^8$, and $R^{10}$ is independently hydrogen, alkoxide or a $C_1$ to $C_{40}$ substituted or unsubstituted hydrocarbyl group;
$R^9$ is —$R^{20}$—SiR'$_3$ or —$R^{20}$—CR'$_3$ where $R^{20}$ is hydrogen, or a $C_1$ to $C_4$ hydrocarbyl, and
each R' is independently a $C_1$ to $C_{20}$ substituted or unsubstituted hydrocarbyl, provided that at least one R' is not H;
T is a bridging group;
each X is, independently, a univalent anionic ligand, or two X are joined and bound to the metal atom to form a metallocycle ring, or two X are joined to form a chelating ligand, a diene ligand, or an alkylidene ligand, provided that the bridged metallocene is not symmetrically substituted (symmetrically substituted means that the same positions on both rings are substituted with the same substituent); and the unbridged metallocene is represented by the formula (B):

$$Cp_mMX_q \quad (B),$$

wherein each Cp is, independently, a cyclopentadienyl group (such as cyclopentadiene, indene or fluorene) which may be substituted or unsubstituted, M is Zr or Hf, X is a leaving group (such as a halide, a hydride, an alkyl group, an alkenyl group or an arylalkyl group), and m=2 or 3, q=0, 1, 2, or 3, and the sum of m+q is equal to the oxidation state of the transition metal, and each Cp, X is bound to M.

This invention also relates to a process for polymerization of monomers (such as olefin monomers) comprising contacting one or more monomers with the above supported catalyst systems.

This invention also relates to a process to produce ethylene polymer compositions comprising: i) contacting in a single reaction zone, in the gas phase or slurry phase, ethylene and $C_3$ to $C_{20}$ comonomer with a catalyst system comprising a support, an activator, and the catalyst system described above, and ii) obtaining an in-situ ethylene polymer composition having at least 50 mol % ethylene and a density of 0.91 g/cc or more, alternately 0.935 g/cc or more.

This invention also relates to a process to produce ethylene polymer compositions comprising: i) contacting in a single reaction zone, in the gas phase or slurry phase, ethylene and $C_3$ to $C_{20}$ comonomer with a catalyst system comprising a support, an activator, and the catalyst system described above, and obtaining an ethylene polymer: a) an RCI,m greater than 20 and less than 35 and an Mw/Mn of 3 to 4; or b) an RCI,m greater than 50 and an Mw/Mn of greater than 5.

This invention further relates to polymer compositions produced by the methods and catalyst systems described herein.

DETAILED DESCRIPTION OF THE PRESENT INVENTION

Figure 1:
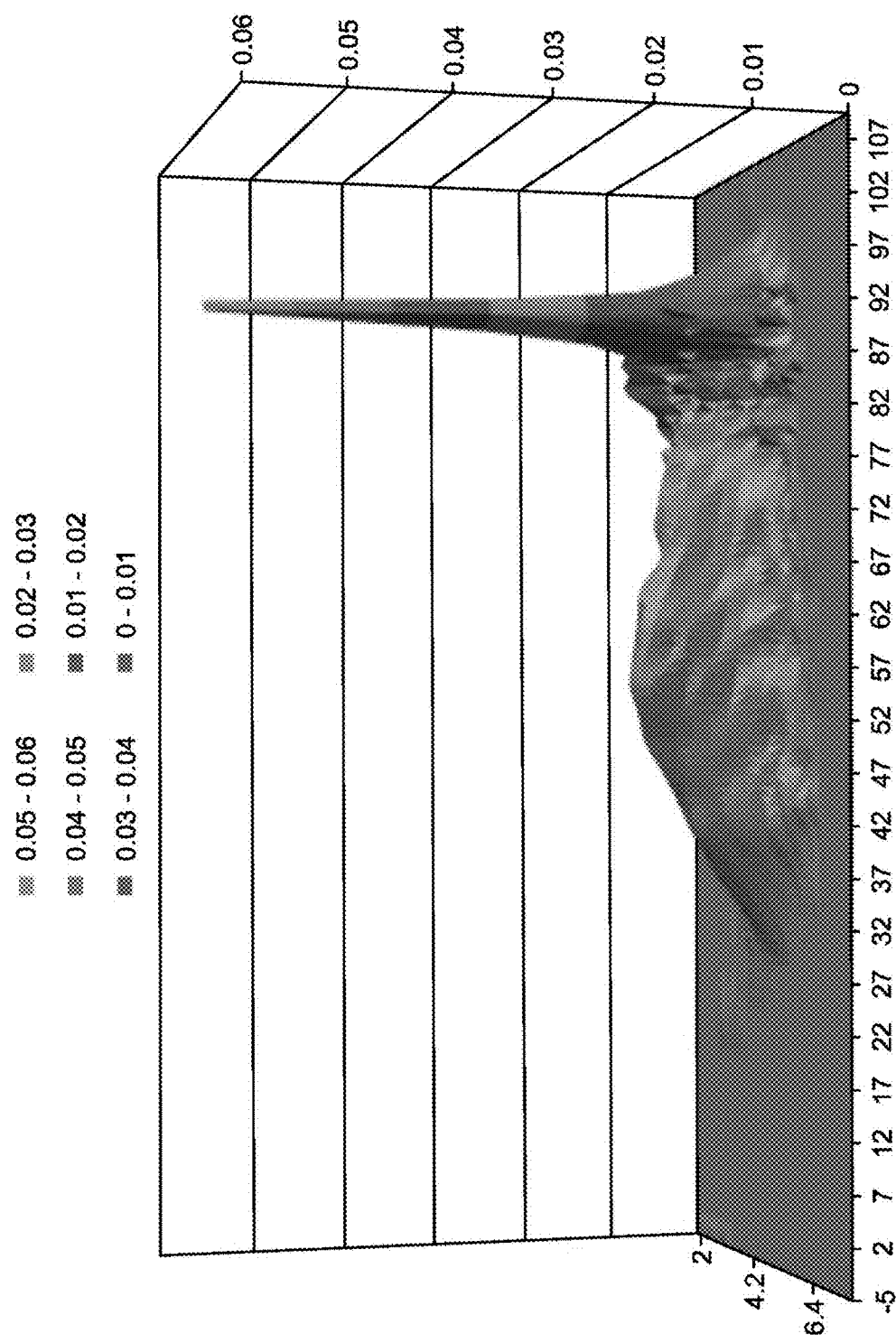
FIG. 1 is a cross fractionation chromatograph of polymer made with supported catalyst B.
Figure 2:
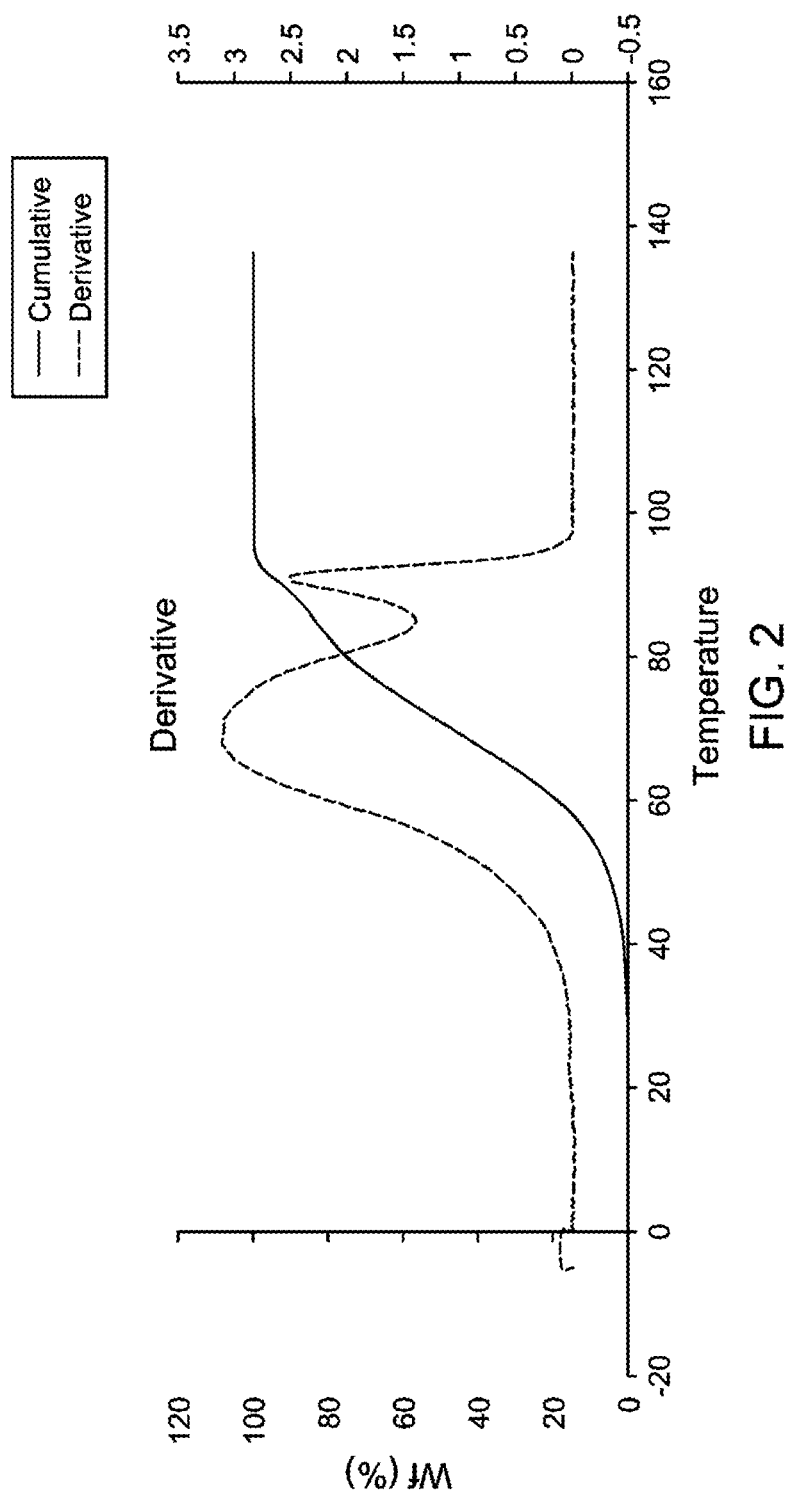
FIG. 2 is a TREF of polymer made with supported catalyst D.
Figure 3:
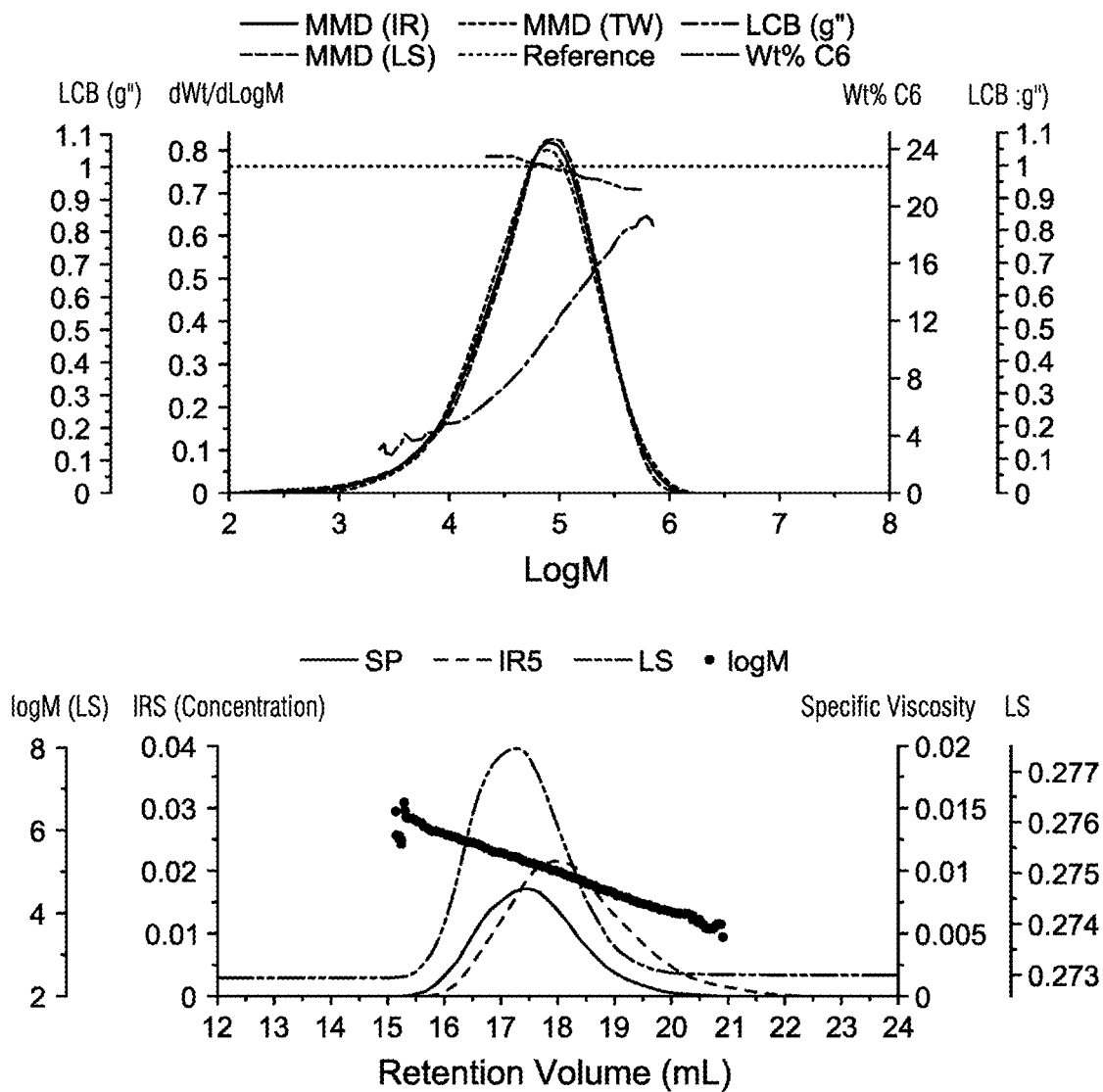
FIG. 3 is a 4D GPC of polymer made with supported catalyst C.

For purposes of this invention and the claims thereto, a "catalyst system" is a combination of at least two catalyst compounds, an activator, and a support material. The catalyst systems may further comprise one or more additional catalyst compounds. The terms "mixed catalyst system", "dual catalyst system", "mixed catalyst", and "supported catalyst system" may be used interchangeably herein with "catalyst system." For the purposes of this invention and the claims thereto, when catalyst systems are described as comprising neutral stable forms of the components, it is well understood by one of ordinary skill in the art, that the ionic form of the component is the form that reacts with the monomers to produce polymers.

The term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization function using an activator which is believed to create a cation as a result of the removal of an anionic group, often referred to as a leaving group, from the transition metal. "Complex," as used herein, is also often referred to as "catalyst precursor,"

"pre-catalyst," "catalyst," "catalyst compound," "metal compound," "transition metal compound," or "transition metal complex." These words are used interchangeably. "Activator" and "cocatalyst" are also used interchangeably.

The terms "hydrocarbyl radical," "hydrocarbyl" and "hydrocarbyl group" are used interchangeably throughout this document. Likewise the terms "group," "radical," and "substituent" are also used interchangeably in this document. For purposes of this invention, "hydrocarbyl radical" is defined to be $C_1$-$C_{100}$ radicals, that may be linear, branched, or cyclic, and when cyclic, aromatic or non-aromatic.

For purposes of this invention and claims thereto, unless otherwise indicated, the term "substituted" means that a hydrogen group has been replaced with a heteroatom, or a heteroatom containing group. For example, substituted hydrocarbyl radicals are radicals in which at least one hydrogen atom of the hydrocarbyl radical has been substituted with at least one functional group such as Cl, Br, F, I, $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$ and the like (where $R*$ is H or a $C_1$ to $C_{20}$ hydrocarbyl group), or where at least one heteroatom has been inserted within a hydrocarbyl ring.

The term "ring atom" means an atom that is part of a cyclic ring structure. By this definition, a benzyl group has six ring atoms and tetrahydrofuran has 5 ring atoms.

A "ring carbon atom" is a carbon atom that is part of a cyclic ring structure. By this definition, a benzyl group has six ring carbon atoms and para-methylstyrene also has six ring carbon atoms.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably, N, O, or S.

A "heterocyclic ring" is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

As used herein the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "continuous" means a system that operates without interruption or cessation. For example, a continuous process to produce a polymer would be one where the reactants are continually introduced into one or more reactors and polymer product is continually withdrawn.

As used herein, the numbering scheme for the Periodic Table groups is the new notation as set out in Chemical and Engineering News, 63(5), 27, (1985).

An "olefin," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For purposes of this invention and the claims thereto, an ethylene polymer having a density of 0.86 g/cm$^3$ or less is referred to as an ethylene elastomer or elastomer; an ethylene polymer having a density of more than 0.86 to less than 0.910 g/cm$^3$ is referred to as an ethylene plastomer or plastomer; an ethylene polymer having a density of 0.910 to 0.940 g/cm$^3$ is referred to as a low density polyethylene; and an ethylene polymer having a density of more than 0.940 g/cm$^3$ is referred to as a high density polyethylene (HDPE). Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm$^3$).

Polyethylene in an overlapping density range, i.e., 0.890 to 0.930 g/cm$^3$, typically from 0.915 to 0.930 g/cm$^3$, which is linear and does not contain long chain branching is referred to as "linear low density polyethylene" (LLDPE) and has been produced with conventional Ziegler-Natta catalysts, vanadium catalysts, or with metallocene catalysts in gas phase reactors and/or in slurry reactors and/or in solution reactors. "Linear" means that the polyethylene has no long chain branches, typically referred to as a branching index ($g'_{vis}$) of 0.97 or above, preferably 0.98 or above. Branching index, $g'_{vis}$, is measured by GPC-4D as described below.

For the purposes of this invention, ethylene shall be considered an α-olefin.

As used herein, $M_n$ is number average molecular weight, $M_w$ is weight average molecular weight, and $M_z$ is z average molecular weight, wt % is weight percent, and mol % is mole percent. Molecular weight distribution (MWD), also referred to as polydispersity index (PDI), is defined to be Mw divided by Mn. Unless otherwise noted, all molecular weights (e.g., Mw, Mn, Mz) are reported in units of g/mol. The following abbreviations may be used herein: Me is methyl, Et is ethyl, t-Bu and tBu are tertiary butyl, iPr and $^i$Pr are isopropyl, Cy is cyclohexyl, THF (also referred to as thf) is tetrahydrofuran, Bn is benzyl, Ph is phenyl, Cp is cyclopentadienyl, Cp* is pentamethyl cyclopentadienyl, Ind is indenyl, Flu is fluorenyl, and MAO is methylalumoxane.

This invention relates to a supported catalyst system comprising: (i) at least one first catalyst component comprising a bridged hafnium metallocene compound; (ii) at least one second catalyst component comprising an unbridged zirconium metallocene compound; (iii) a support material; and (iv) activator; wherein the bridged hafnium metallocene compound is represented by the formula (A):

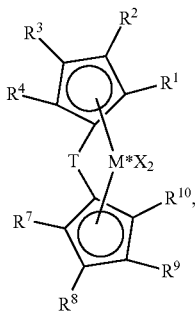

(A)

where:
M* is Hf or Zr;
each $R^1$, $R^2$, and $R^4$ is independently hydrogen, alkoxide or a $C_1$ to $C_{40}$ (preferably $C_1$ to Cm) substituted or unsubstituted hydrocarbyl group;
$R^3$ is independently hydrogen, alkoxide or a $C_1$ to $C_{40}$ substituted or unsubstituted hydrocarbyl group or is —$R^{20}$—SiR'$_3$ or —$R^{20}$—CR'$_3$ where $R^{20}$ is hydrogen, or a $C_1$ to $C_4$ hydrocarbyl, and each R' is independently a $C_1$ to $C_{20}$ substituted or unsubstituted hydrocarbyl, provided that at least one R' is not H;
each $R^7$, $R^8$, and $R^{10}$ is independently hydrogen, alkoxide or a $C_1$ to $C_{40}$ (preferably $C_1$ to Cm) substituted or unsubstituted hydrocarbyl group;
$R^9$ is —$R^{20}$—SiR'$_3$ or —$R^{20}$—CR'$_3$ where $R^{20}$ is hydrogen or a $C_1$ to $C_4$ hydrocarbyl (preferably $R^{20}$ is $CH_2$), and each R' is independently a $C_1$ to $C_{20}$ substituted or unsubstituted hydrocarbyl, (preferably R' is alkyl, such as Me, or aryl, such as phenyl), provided that at least one R' is not H, alternately 2 R' are not H, alternately 3 W are not H;
T is a bridging group, such as $SiR^{21}R^{22}$, where $R^{21}$ and $R^{22}$ are independently hydrogen, halogen, or a $C_1$-$C_{20}$ containing hydrocarbyl, substituted hydrocarbyl, and optionally $R^{21}$ and $R^{22}$ join to form a substituted or unsubstituted, saturated, partially unsaturated or aromatic, cyclic or polycyclic substituent, optionally $R^{21}$ and $R^{22}$ are the same or different; and
each X is, independently, a univalent anionic ligand, or two X are joined and bound to the metal atom to form a metallocycle ring, or two X are joined to form a chelating ligand, a diene ligand, or an alkylidene ligand, where the bridged metallocene is not symmetrical; and
the unbridged metallocene compound is represented formula (B):

  (B)

wherein each Cp is, independently, a cyclopentadienyl group (such as cyclopentadiene, indene or fluorene) which may be substituted or unsubstituted, M is zirconium, or hafnium (preferably Zr), X is a leaving group (such as a halide, a hydride, an alkyl group, an alkenyl group or an arylalkyl group), and m=2 or 3, q=0, 1, 2, or 3, and the sum of m+q is equal to the oxidation state of the transition metal. In some embodiments, m=2 in the metallocene catalyst compound.

In a preferred embodiment of the invention, the unbridged metallocene compound is represented by the formula $Cp^A Cp^B ZrX'_n$, wherein $Cp^A$ and $Cp^B$ may each be independently selected from the group consisting of cyclopentadienyl ligands and ligands isolobal to cyclopentadienyl, either or both $Cp^A$ and $Cp^B$ may contain heteroatoms, and either or both $Cp^A$ and $Cp^B$ may be substituted; wherein X' may be any leaving group; wherein n is 0, 1, or 2.

This invention also relates to a process for polymerization of olefin monomers comprises contacting one or more monomers with the above supported catalyst systems.

The above two catalyst components can have different hydrogen responses (each having a different reactivity toward hydrogen) during the polymerization process. Hydrogen is often used in olefin polymerization to control the final properties of the polyolefin. The first catalyst component can show a more negative response to changes of hydrogen concentration in reactor than the second catalyst component. Owing to the differing hydrogen response of the catalyst components in the supported catalyst systems, the properties of resulting polymer are controllable. Changes of hydrogen concentration in reactor may affect molecular weight, molecular weight distributions, and other properties of the resulting polyolefin when using a combination of such two catalyst components. Thus, this invention further provides a multi-modal polyolefin obtained from polymerizations using the above supported catalyst systems.

In a useful embodiment, catalyst A is a good comonomer (such as hexene) incorporator and yields polyethylene with higher molecular weight than catalyst B which under similar conditions yields lower molecular weight than catalyst A. Catalyst B can also incorporate less comonomer (such as hexene) under similar reaction conditions. When catalyst A and catalyst B are combined on one support, an in-reactor blend of polyethylene is produced with a mix of low and high density resins in which the higher density resin (higher melting) is combined with lower density higher molecular weight resin. Catalyst A may be a single isomer or a combination of isomers, e.g., 2, 3, 4, 5, or 6 isomers, typically 2 isomers. Catalyst B may be a combination of isomers, single isomer or a combination of isomers, e.g., 2, 3, 4, 5, or 6 isomers, typically 2 isomers.

The two transition metal compounds may be used in any ratio. Preferred molar ratios of (A) bridged hafnium transition metal compound to (B) unbridged transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact catalyst compounds chosen, the method of activation, and the end product desired. In a particular embodiment, when using the two catalyst compounds, where both are activated with the same activator, useful mole percents, based upon the molecular weight of the catalyst compounds, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

For purposes of this invention one metallocene catalyst compound is considered different from another if they differ by at least one atom. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of this invention, e.g., rac-dimethylsilylbis(2-methyl 4-phenyl)hafnium dimethyl is considered to be the same as meso-dimethylsilylbis(2-methyl 4-phenyl)hafnium dimethyl. Thus, as used herein, a single, bridged, asymmetrically substituted metallocene catalyst component having a racemic and/or meso isomer does not, itself, constitute two different bridged, metallocene catalyst components.

This invention also relates to a process to produce ethylene polymer compositions comprising: i) contacting in a single reaction zone, in the gas phase or slurry phase, ethylene and $C_3$ to $C_{20}$ comonomer with a catalyst system comprising a support, an activator, and the catalyst system described above, and obtaining an ethylene polymer: a) an RCI,m greater than 30 and an Mw/Mn of greater than 3; or b) an RCI,m greater than 50 and an Mw/Mn of greater than 5. It is believed that the ethylene polymer produced herein (i.e., an in-situ ethylene polymer composition) has at least two polymer components where the first component is derived from the catalyst represented by formula A and has more comonomer (such as hexene) and higher Mw as compared to the second component derived from the catalyst represented by formula B which has less comonomer (such as hexene) and lower Mw as compared to the first component as determined by 4D GPC.

Bridged Hafnium Metallocene

In aspects of the invention, the supported catalyst systems comprise a transition metal complex represented by the formula (A):

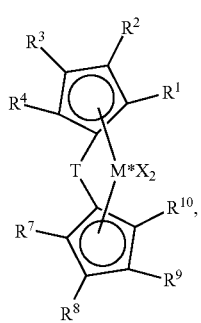

(A)

where

M* is a group 4 metal, preferably Hf or Zr, typically Hf;
each $R^1$, $R^2$, and $R^4$ is independently hydrogen, alkoxide or a $C_1$ to $C_{40}$ (preferably $C_1$ to $C_{20}$) substituted or unsubstituted hydrocarbyl group (preferably each $R^1$, $R^2$, $R^3$, and $R^4$ is, independently a $C_1$ to $C_{20}$ alkyl group), preferably 1, 2, 3, or 4 of R', $R^2$, $R^3$, and $R^4$ are not H;
$R^3$ is independently hydrogen, alkoxide or a $C_1$ to $C_{40}$ substituted or unsubstituted hydrocarbyl group (preferably a $C_1$ to $C_{20}$ substituted or unsubstituted hydrocarbyl group, preferably $R^3$ is a $C_1$ to $C_{20}$ alkyl group), or is $—R^{20}—SiR'_3$ or $—R^{20}—CR'_3$ where
$R^{20}$ is hydrogen, or a $C_1$ to $C_4$ hydrocarbyl, and each R' is independently a $C_1$ to $C_{20}$ substituted or unsubstituted hydrocarbyl, provided that at least one R' is not H; each $R^7$, $R^8$, and $R^{10}$ is independently hydrogen, alkoxide or a $C_1$ to $C_{40}$ (preferably $C_1$ to $C_{20}$) substituted or unsubstituted hydrocarbyl group (preferably each $R^7$, $R^8$, and $R^{10}$ is, independently a $C_1$ to $C_{20}$ alkyl group);
$R^9$ is $—R^{20}—SiR'_3$ or $—R^{20}—CR'_3$ where $R^{20}$ is hydrogen or a $C_1$ to $C_4$ hydrocarbyl (preferably $R^{20}$ is $CH_2$), and R' is a $C_1$ to $C_{20}$ substituted or unsubstituted hydrocarbyl, (preferably k is alkyl, such as Me, or aryl, such as phenyl), provided that at least one R' is not H;
T is a bridging group; such as $SiR^{21}R^{22}$, where $R^{21}$ and $R^{22}$ are independently hydrogen, halogen, or a $C_1$-$C_{20}$ containing hydrocarbyl, substituted hydrocarbyl, and optionally $R^{21}$ and $R^{22}$ join to form a substituted or unsubstituted, saturated, partially unsaturated or aromatic, cyclic or polycyclic substituent, optionally $R^{21}$ and $R^{22}$ are the same or different; and
each X is, independently, a univalent anionic ligand, or two X are joined and bound to the metal atom to form a metallocycle ring, or two X are joined to form a chelating ligand, a diene ligand, or an alkylidene ligand.

In a preferred embodiment of the invention, each $R^1$, $R^2$, and $R^4$ is independently hydrogen, or a substituted $C_1$ to $C_{12}$ hydrocarbyl group or an unsubstituted $C_1$ to $C_{12}$ hydrocarbyl group, preferably each $R^1$, $R^2$, and $R^4$ is independently a $C_1$ to $C_{20}$ alkyl group), preferably hydrogen, methyl, ethyl, propyl, butyl, pentyl, hexyl, or an isomer thereof, preferably hydrogen or methyl.

In a preferred embodiment of the invention, $R^3$ is hydrogen, or a substituted $C_1$ to $C_{12}$ hydrocarbyl group or an unsubstituted $C_1$ to $C_{12}$ hydrocarbyl group, preferably $R^3$ is a $C_1$ to $C_{20}$ alkyl group, preferably hydrogen, methyl, ethyl, propyl, butyl, pentyl, hexyl, or an isomer thereof, preferably hydrogen or methyl, or $R^3$ is $—R^{20}—SiR'_3$ or is $—R^{20}—CR'_3$ where $R^{20}$ is hydrogen or a $C_1$ to $C_4$ hydrocarbyl (preferably $CH_2$; $CH_2CH_2$, $(Me)CHCH_2$, $(Me)CH$), and each R' is independently hydrogen or a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R' is not H, alternately 2 R' are not H, alternately 3 R' are not H.

Alternately, $R^3$ is $—CH_2—SiMe_3$, $—CH_2—SiEt_3$, $—CH_2—SiPr_3$, $—CH_2—SiBu_3$, $—CH_2—SiCy_3$, $—CH_2—C(CH_3)_3$, $—CH_2—CH(CH_3)_2$, $—CH_2CPh_3$, $—CH_2(C_6Me_5)$, $—CH_2—C(CH_3)_2Ph$, $—CH_2—C(Cy)Ph_2$. $—CH_2—SiH(CH_3)_2$, $—CH_2SiPh_3$, $—CH_2—Si(CH_3)_2Ph$, $—CH_2—Si(CH_3)_2Ph$, $—CH_2—Si(CH_3)Ph_2$, $—CH_2—Si(Et)_2Ph$, $—CH_2—Si(Et)Ph_2$, $—CH_2—Si(CH_2)_3Ph$, $—CH_2—Si(CH_2)_4Ph$, $—CH_2—Si(Cy)Ph_2$, or $—CH_2—Si(Cy)_2Ph$.

Alternately, each of $R^1$, $R^2$, $R^3$, and $R^4$ is not H.

In a preferred embodiment of the invention, each $R^7$, $R^8$, and $R^{10}$ is independently hydrogen, or a substituted $C_1$ to $C_{12}$ hydrocarbyl group or an unsubstituted $C_1$ to $C_{12}$ hydrocarbyl group, preferably a $C_1$ to $C_{20}$ alkyl group, preferably hydrogen, methyl, ethyl, propyl, butyl, pentyl, hexyl, or an isomer thereof, preferably a hydrogen or methyl.

In a preferred embodiment of the invention, $R^9$ is $—R^{20}—SiR'_3$ or is $—R^{20}—CR'_3$ where $R^{20}$ is hydrogen or a $C_1$ to $C_4$ hydrocarbyl (preferably $CH_2$, $CH_2CH_2$, $(Me)CHCH_2$, $(Me)CH$), and each R' is independently hydrogen or a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R' is not H, alternately 2 R' are not H, alternately 3 R' are not H.

Alternately, $R^9$ is $—CH_2—SiMe_3$, $—CH_2—SiEt_3$, $—CH_2—SiPr_3$, $—CH_2—SiBu_3$, $—CH_2—SiCy_3$, $—CH_2—C(CH_3)_3$, $—CH_2—CH(CH_3)_2$, $—CH_2CPh_3$, $—CH_2(C_6Me_5)$, $—CH_2—C(CH_3)_2Ph$, $—CH_2—C(Cy)Ph_2$. $—CH_2—SiH(CH_3)_2$, $—CH_2SiPh_3$, $—CH_2—Si(CH_3)_2Ph$, $—CH_2—Si(CH_3)Ph_2$, $—CH_2—Si(Et)_2Ph$, $—CH_2—Si(EOPh_2$, $—CH_2—Si(CH_2)_3Ph$, $—CH_2—Si(CH_2)_4Ph$, $—CH_2—Si(Cy)Ph_2$, or $—CH_2—Si(Cy)_2Ph$.

Alternately, $R^9$ is n-propyl, n-butyl, n-pentyl or n-hexyl.

Alternately, $R^3$ and $R^9$ are independently —$R^{20}$—$SiR'_3$ or is —$R^{20}$—$CR'_3$ where $R^{20}$ is a $C_1$ to $C_4$ hydrocarbyl (preferably $CH_2$, $CH_2CH_2$, $(Me)CHCH_2$, $(Me)CH$), and each R' is independently hydrogen, or a $C_1$ to $C_{20}$ substituted or unsubstituted hydrocarbyl, preferably a substituted $C_1$ to $C_{12}$ hydrocarbyl group or an unsubstituted $C_1$ to $C_{12}$ hydrocarbyl group, preferably methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl; alternately $R^3$ and $R^9$ are selected from the group consisting of: —$CH_2$—$SiMe_3$, —$CH_2$—$SiEt_3$, —$CH_2$—$SiPr_3$, —$CH_2$—$SiBu_3$, —$CH_2$—$SiCy_3$, —$CH_2$—$C(CH_3)_3$, —$CH_2$—$CH(CH_3)_2$, —$CH_2CPh_3$, —$CH_2(C_6Me_5)$, —$CH_2$—$C(CH_3)_2Ph$, —$CH_2$—$C(Cy)Ph_2$. —$CH_2$—$SiH(CH_3)_2$, —$CH_2SiPh_3$, —$CH_2$—$Si(CH_3)_2Ph$, —$CH_2$—$Si(CH_3)Ph_2$, —$CH_2$—$Si(Et)_2Ph$, —$CH_2$—$Si(ET)Ph_2$, —$CH_2$—$Si(CH_2)_3Ph$, —$CH_2$—$Si(CH_2)_4Ph$, —$CH_2$—$Si(Cy)Ph_2$, or —$CH_2$—$Si(Cy)_2Ph$.

Alternately, each X may be, independently, a halide, a hydride, an alkyl group, an alkenyl group or an arylalkyl group.

Alternately, each X is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), preferably each X is independently selected from halides, aryls and $C_1$ to $C_5$ alkyl groups, preferably each X is a phenyl, methyl, ethyl, propyl, butyl, pentyl, or chloro group.

Preferably, T is a bridging group containing at least one Group 13, 14, 15, or 16 element, in particular boron or a Group 14, 15 or 16 element. Examples of suitable bridging groups include $P(=S)R''$, $P(=Se)R''$, $P(=O)R''$, $R''_2C$, $R''_2Si$, $R''_2Ge$, $R''_2CCR''_2$, $R''_2CCR''_2CR''_2$, $R''_2CCR''_2CR''_2CR''_2$, $R''C=CR''$, $R''C=CR''CR''_2$, $R''_2CCR''=CR''CR''_2$, $R''C=CR''CR''=CR''$, $R''C=CR''CR''_2CR''_2$, $R''_2CSiR''_2$, $R''_2SiSiR''_2$, $R''_2SiOSiR''_2$, $R''_2CSiR''_2CR''_2$, $R''_2SiCR''_2SiR''_2$, $R''C=CR''SiR''_2$, $R''_2CGeR''_2$, $R''_2GeGeR''_2$, $R''_2CGeR''_2CR''_2$, $R''_2GeCR''_2GeR''_2$, $R''_2SiGeR''_2$, $R''C=CR''GeR''_2$, $R''B$, $R''_2C$—$BR''$, $R''_2C$—$BR''$—$CR''_2$, $R''_2C$—$O$—$CR''_2$, $R''_2CR''_2C$—$O$—$CR''_2CR''_2$, $R''_2C$—$O$—$CR''_2CR''_2$, $R''_2C$—$O$—$CR''_2CR''_2$, $R''_2C$—$O$—$CR''=CR''$, $R''_2C$—$S$—$CR''_2$, $R''_2CR''_2C$—$S$—$CR''_2CR''_2$, $R''_2C$—$S$—$CR''_2CR''_2$, $R''_2C$—$S$—$CR''=CR''$, $R''_2C$—$Se$—$CR''_2$, $R''_2CR''_2C$—$Se$—$CR''_2CR''_2$, $R''_2C$—$Se$—$CR''_2CR''_2$, $R''_2C$—$Se$—$CR''=CR''$, $R''_2C$—$N=CR''$, $R''_2C$—$NR''$—$CR''_2$, $R''_2C$—$NR''$—$CR''_2CR''_2$, $R''_2C$—$NR''$—$CR''=CR''$, $R''_2CR''_2C$—$NR''$—$CR''_2CR''_2$, $R''_2C$—$P=CR''$, $R''_2C$—$PR''$—$CR''_2$, O, S, Se, Te, $NR''$, $PR''$, $AsR''$, $SbR''$, O—O, S—S, $R''N$—$NR''$, $R''P$—$PR''$, O—S, O—$NR''$, O—$PR''$, S—$NR''$, S—$PR''$, and $R''N$—$PR''$ where R'' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R'' may join to form a substituted or unsubstituted, saturated, partially unsaturated or aromatic, cyclic or polycyclic substituent. Preferred examples for the bridging group T include $CH_2$, $CH_2CH_2$, $SiMe_2$, $SiPh_2$, $SiMePh$, $Si(CH_2)_3$, $Si(CH_2)_4$, O, S, NPh, PPh, NMe, PMe, NEt, NPr, NBu, PEt, PPr, and PBu.

In a preferred embodiment of the invention in any embodiment of any formula described herein, T is represented by the formula $R^a_2J$ or $(R^a_2J)_2$, where J is C, Si, or Ge, and each $R^a$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^a$ can form a cyclic structure including aromatic, partially saturated, or saturated cyclic or fused ring system. Preferably, T is a bridging group comprising carbon or silica, such as dialkylsilyl, preferably T is selected from $CH_2$, $CH_2CH_2$, $C(CH_3)_2$, $SiMe_2$, $SiPh_2$, $SiMePh$, silylcyclobutyl $(Si(CH_2)_3)$, $(Ph)_2C$, $(p-(Et)_3SiPh)_2C$, and cyclopentasilylene $(Si(CH_2)_4)$. $GeMe_2$, $GePh_2$.

In a preferred embodiment of the invention, diastereomers may be formed when the bridge is chiral such as when T is SiMePh, SiEthMe, or CPhMe. The molar ratio of diastereomers may be from 1:1 to 100:1; preferably about 1:1. Amounts of diastereomers are determined by proton NMR. $^1H$ NMR data are collected at 23° C. in a 5 mm probe using a 400 MHz Bruker spectrometer with deuterated methylene chloride. (Note that some of the examples herein may use deuterated benzene, but for purposes of the claims, methylene chloride shall be used.) Data is recorded using a maximum pulse width of 45°, 5 seconds between pulses and signal averaging 16 transients. The spectrum is normalized to protonated methylene chloride in the deuterated methylene chloride, which is expected to show a peak at 5.32 ppm.

Useful asymmetric catalysts are preferably such that a mirror plane cannot be drawn through the metal center and the cyclopentadienyl moieties bridged to the metal center are structurally different.

Catalyst compounds that are particularly useful in this invention include one or more of: $SiMe_2(Me_4Cp)(3-nPrCp)HfMe_2$; $SiPh_2(Me_4Cp)(3-nPrCp)HfMe_2$; $Me_2Ge(Me_4Cp)(3-nPrCp)HfMe_2$; $Ph_2Ge(Me_4Cp)(3-nPrCp)HfMe_2$; $PhMeSi(Me_4Cp)(3-nPrCp)HfMe_2$; $Et_2Si(Me_4Cp)(3-nPrCp)HfMe_2$; $SiMe_2(EtMe_3Cp)(3-nPrCp)HfMe_2$; $SiMe_2(Me_4Cp)(3-nBuCp)HfMe_2$; $SiPh_2(Me_4Cp)(3-nBuCp)HfMe_2$; $Me_2Ge(Me_4Cp)(3-nBuCp)HfMe_2$; $Ph_2Ge(Me_4Cp)(3-nBuCp)HfMe_2$; $PhMeSi(Me_4Cp)(3-nBuCp)HfMe_2$; $Et_2Si(Me_4Cp)(3-nBuCp)HfMe_2$; $SiMe_2(EtMe_3Cp)(3-nBuCp)HfMe_2$; $SiMe_2(Me_4Cp)(3-CH_2—SiMe_3-Cp)HfMe_2$; $SiPh_2(Me_4Cp)(3-CH_2—SiMe_3-Cp)HfMe_2$; $Me_2Ge(Me_4Cp)(3-CH_2—SiMe_3-Cp)HfMe_2$; $Ph_2Ge(Me_4Cp)(3-CH_2—SiMe_3-Cp)HfMe_2$; $PhMeSi(Me_4Cp)(3-CH_2—SiMe_3-Cp)HfMe_2$; $Et_2Si(Me_4Cp)(3-CH_2—SiMe_3-Cp)HfMe_2$; $SiMe_2(EtMe_3Cp)(3-CH_2—SiMe_3-Cp)HfMe_2$; $SiMe_2(Me_4Cp)(3-CH_2—SiPhMe_2-Cp)HfMe_2$; $SiPh_2(Me_4Cp)(3-CH_2—SiPhMe_2-Cp)HfMe_2$; $Me_2Ge(Me_4Cp)(3-CH_2—SiPhMe_2)HfMe_2$; $Ph_2Ge(Me_4Cp)(3-CH_2—SiPhMe_2)HfMe_2$; $PhMeSi(Me_4Cp)(3-CH_2—SiPhMe_2-Cp)HfMe_2$; $Et_2Si(Me_4Cp)(3-CH_2—SiPhMe_2-Cp)HfMe_2$; $SiMe_2(EtMe_3Cp)(3-CH_2—SiPh_3-Cp)HfMe_2$; $SiMe_2(Me_4Cp)(3-CH_2—SiPh_3-Cp)HfMe_2$; $SiPh_2(Me_4Cp)(3-CH_2—SiPh_3-Cp)HfMe_2$; $Me_2Ge(Me_4Cp)(3-CH_2—SiPh_3)HfMe_2$; $Ph_2Ge(Me_4Cp)(3-CH_2—SiPh_3)HfMe_2$; $PhMeSi(Me_4Cp)(3-CH_2—SiPh_3-Cp)HfMe_2$; $Et_2Si(Me_4Cp)(3-CH_2—SiPh_3-Cp)HfMe_2$; $SiMe_2(EtMe_3Cp)(3-CH_2—SiPh_3-Cp)HfMe_2$; $SiMe_2(2-Me, 3-n-Pr-Ind)_2HfMe_2$; $SiPh_2(2-Me, 3-n-Pr-Ind)_2HfMe_2$; $GeMe_2(2-Me, 3-n-Pr-Ind)_2HfMe_2$; $GePh_2(2-Me, 3-n-Pr-Ind)_2HfMe_2$; $SiPhMe(2-Me, 3-n-Pr-Ind)_2HfMe_2$; $Et_2Si(2-Me, 3-n-Pr-Ind)_2HfMe_2$; $SiMe_2(2-Me, 3-n-Bu-Ind)_2HfMe_2$; $SiPh_2(2-Me, 3-n-Bu-Ind)_2HfMe_2$; $GeMe_2(2-Me, 3-n-Bu-Ind)_2HfMe_2$; $GePh_2(2-Me, 3-n-Bu-Ind)_2HfMe_2$; $SiPhMe(2-Me, 3-n-Bu-Ind)_2HfMe_2$; $Et_2Si(2-Me, 3-n-Bu-Ind)_2HfMe_2$; $SiMe_2(2-Me,3-CH_2— SiMe_3-Ind)_2HfMe_2$; $SiPh_2(2-Me,3-CH_2—SiMe_3-Ind)_2HfMe_2$; $GeMe_2(2-Me,3-CH_2— SiMe_3-Ind)_2HfMe_2$; $GePh_2(2-Me,3-CH_2—SiMe_3-Ind)_2HfMe_2$; $SiPhMe(2-Me,3-CH_2—SiMe_3-Ind)_2HfMe_2$; $Et_2Si(2-Me,3-CH_2—SiMe_3-Ind)_2HfMe_2$; $SiMe_2(2-Me,3-CH_2—SiPhMe_2-$ Ind)$_2$HfMe$_2$; SiPh$_2$(2-Me,3-CH$_2$—SiPhMe$_2$-Ind)$_2$HfMe$_2$; GeMe$_2$(2-Me,3-CH$_2$—SiPhMe$_2$-Ind)$_2$HfMe$_2$; GePh$_2$(2-Me, 3-CH$_2$—SiPhMe$_2$-Ind)$_2$HfMe$_2$; SiPhMe(2-Me,3-CH$_2$—SiPhMe$_2$-Ind)$_2$HfMe$_2$; Et$_2$Si(2-Me,3-CH$_2$—SiPhMe$_2$-Ind)$_2$HfMe$_2$; SiMe$_2$(2-Me,3-CH$_2$—SiPh$_3$-Ind)$_2$HfMe$_2$; SiPh$_2$(2-Me,3-CH$_2$— SiPh$_3$-Ind)$_2$HfMe$_2$; GeMe$_2$(2-Me,3-CH$_2$—SiPh$_3$-Ind)$_2$HfMe$_2$; GePh$_2$(2-Me,3-CH$_2$—SiPh$_3$-Ind)$_2$HfMe$_2$; SiPhMe(2-Me,3-CH$_2$—SiPh$_3$-Ind)$_2$HfMe$_2$; Et$_2$Si(2-Me,3-CH$_2$—SiPh$_3$-Ind)$_2$HfMe$_2$, and the alkyl or halide versions thereof where the Mee is substituted with Eta, C$_{12}$, Br$_2$, I$_2$, or Ph$_2$.

Unbridged Metallocene

As used herein, the term "metallocene compound" in this invention includes compounds having two or three Cp ligands (cyclopentadienyl and ligands isolobal to cyclopentadienyl) bound to at least one Zr or Hf metal atom, and one or more leaving group(s) bound to the at least one metal atom.

For purposes of this invention and claims thereto in relation to all metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

For purposes of this invention and claims thereto, "alkoxides" include those where the alkyl group is a C$_1$ to C$_{10}$ hydrocarbyl. The alkyl group may be straight chain, branched, or cyclic. The alkyl group may be saturated or unsaturated. In some embodiments, the alkyl group may comprise at least one aromatic group.

Unbridged zirconium metallocenes useful herein are further represented by the formula (C):

$$Cp_mZrX_q \qquad (C)$$

wherein each Cp is, independently, a cyclopentadienyl group (such as cyclopentadiene, indene or fluorene) which may be substituted or unsubstituted, X is a leaving group (such as a halide, a hydride, an alkyl group, an alkenyl group or an arylalkyl group), and m=1 or 2, n=0, 1, 2 or 3, q=0, 1, 2, or 3, and the sum of m+q is equal to the oxidation state of the transition metal. In some embodiments, m is 2.

In an embodiment each X may be, independently, a halide, a hydride, an alkyl group, an alkenyl group or an arylalkyl group.

Alternately, each X is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), preferably each X is independently selected from halides, aryls and C$_1$ to C$_5$ alkyl groups, preferably each X is a phenyl, methyl, ethyl, propyl, butyl, pentyl, or chloro group.

Typically, each Cp group is, independently, a substituted or unsubstituted cyclopentadiene, a substituted or unsubstituted indene, or a substituted or unsubstituted fluorene.

Independently, each Cp group may be substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example, tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as, but not limited to, olefinically unsaturated substituents including vinyl-terminated ligands, for example but-3-enyl, prop-2-enyl, hex-5-enyl and the like. Also, at least two R groups, preferably two adjacent R groups, may be joined to form a ring structure having from 3 to 30 atoms selected from carbon, nitrogen, oxygen, phosphorus, silicon, germanium, aluminum, boron or a combination thereof.

In an embodiment of the Cp group, the substituent(s) R are, independently, hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, N, O, S, P, or a C$_1$ to C$_{20}$ hydrocarbyl substituted with an N, O, S and or P heteroatom or heteroatom containing group (typically having up to 12 atoms, including the N, O, S and P heteroatoms).

Non-limiting examples of Cp groups include cyclopentadienyl ligands, cyclopentaphenanthrenyl ligands, indenyl ligands, benzindenyl ligands, fluorenyl ligands, octahydrofluorenyl ligands, cyclooctatetraenyl ligands, cyclopentacyclododecene ligands, azenyl ligands, azulene ligands, pentalene ligands, phosphoyl ligands, phosphinimine ligands (WO 99/40125), pyrrolyl ligands, pyrazolyl ligands, carbazolyl ligands, borabenzene ligands and the like, including hydrogenated versions thereof, for example tetrahydroindenyl ligands. In another embodiment, each Cp may, independently, comprise one or more heteroatoms, for example, nitrogen, silicon, boron, germanium, sulfur and phosphorus, in combination with carbon atoms to form an open, acyclic, or preferably a fused, ring or ring system, for example, a heterocyclopentadienyl ancillary ligand. Other Cp ligands include but are not limited to porphyrins, phthalocyanines, corrins and other polyazamacrocycles.

In another aspect, the unbridged metallocene catalyst component is represented by the formula (D):

$$Cp^ACp^BZrX_q \qquad (D),$$

wherein X and q are as described above, preferably q is 1 or 2, and each Cp$^A$ and Cp$^B$ in formula (D) is independently as defined for Cp above and may be the same or different cyclopentadienyl ligands or ligands isolobal to cyclopentadienyl, either or both of which may contain heteroatoms and either or both of which may be substituted by a group R. In one embodiment, Cp$^A$ and Cp$^B$ are independently selected from the group consisting of cyclopentadienyl, indenyl, tetrahydroindenyl, fluorenyl, and substituted derivatives of each.

Independently, each $Cp^A$ and $Cp^B$ of formula (D) may be unsubstituted or substituted with any one or combination of substituent groups R. Non-limiting examples of substituent groups R as used in structure (D) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular, non-limiting examples of alkyl substituents R associated with formula (D) includes methyl, ethyl, propyl, butyl, pentyl, hexyl, cyclopentyl, cyclohexyl, benzyl, phenyl, methylphenyl, and tert-butylphenyl groups and the like, including all their isomers, for example, tertiarybutyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as, but not limited to, olefinically unsaturated substituents including vinyl-terminated ligands, for example, 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R, such as 1-butanyl, may form a bonding association to the element M.

The ligands $Cp^A$ and $Cp^B$ of formula (D) are different from each other in one embodiment, and the same in another embodiment.

It is contemplated that the metallocene catalyst components described above include their structural or optical or enantiomeric isomers (racemic mixture), and may be a pure enantiomer in one embodiment.

The unbridged metallocene catalyst component may comprise any combination of any embodiments described herein.

Suitable unbridged metallocenes useful herein include, but are not limited to, the metallocenes disclosed and referenced in the U.S. patents cited above, as well as those disclosed and referenced in U.S. Pat. Nos. 7,179,876; 7,169,864; 7,157,531; 7,129,302; 6,995,109; 6,958,306; 6,884,748; 6,689,847; U.S. Publication 2007/0055028, and PCT Publications WO 97/22635; WO 00/699/22; WO 01/30860; WO 01/30861; WO 02/46246; WO 02/50088; WO 04/026921; and WO 06/019494, all fully incorporated herein by reference. Additional catalysts suitable for use herein include those referenced in U.S. Pat. Nos. 6,309,997; 6,265,338; U.S. Publication 2006/019925, and the following articles: Chem Rev 2000, 100, 1253; Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Exemplary unbridged metallocene compounds useful herein are include: bis(cyclopentadienyl)zirconium dichloride; bis(cyclopentadienyl)zirconium dimethyl; bis(n-butylcyclopentadienyl)zirconium dichloride; bis(n-butylcyclopentadienyl)zirconium dimethyl; bis(pentamethylcyclopentadienyl)zirconium dichloride; bis(pentamethylcyclopentadienyl)zirconium dimethyl; bis(pentamethylcyclopentadienyl)hafnium dichloride; bis(pentamethylcyclopentadienyl)zirconium dimethyl; bis(1-methyl-3-n-butylcyclopentadienyl)zirconium dichloride; bis(1-methyl-3-n-butylcyclopentadienyl)zirconium dimethyl; bis(1-methyl-3-phenylcyclopentadienyl)zirconium dichloride; bis(1-methyl-3-phenylcyclopentadienyl)zirconium dimethyl; bis(1-methyl-3-n-butylcyclopentadienyl)hafnium dichloride; bis(1-methyl-3-n-butylcyclopentadienyl)zirconium dimethyl; bis(indenyl)zirconium dichloride, bis(indenyl)zirconium dimethyl; bis(tetrahydro-1-indenyl)zirconium dichloride; bis(tetrahydro-1-indenyl)zirconium dimethyl; (n-propyl cyclopentadienyl)(pentamethyl cyclopentadienyl)zirconium dichloride; (n-propyl cyclopentadienyl)(pentamethyl cyclopentadienyl)zirconium dimethyl; rac/meso-(1-Ethylindenyl)zirconium dichloride; rac/meso-(1-Ethylindenyl)zirconium dimethyl; rac/meso-(1-methylindenyl)zirconium dichloride; rac/meso-(1-methylindenyl)zirconium dimethyl; rac/meso-(1-propylindenyl)zirconium dichloride; rac/meso-(1-propylindenyl)zirconium dimethyl; rac/meso-(1-butylindenyl)zirconium dichloride; rac/meso-(1-butylindenyl)zirconium dimethyl; meso-(1-methylindenyl) zirconium dichloride; meso-(1-methylindenyl) zirconium dimethyl; (1-methylindenyl)(pentamethyl cyclopentadienyl) zirconium dichloride; and (1-methylindenyl)(pentamethyl cyclopentadienyl) zirconium dimethyl.

Preferred unbridged metallocene compounds useful herein are include: bis(cyclopentadienyl)zirconium dichloride; bis(n-butylcyclopentadienyl)zirconium dichloride; bis(n-butylcyclopentadienyl)zirconium dimethyl; bis(pentamethylcyclopentadienyl)zirconium dichloride; bis(pentamethylcyclopentadienyl)zirconium dimethyl; bis(pentamethylcyclopentadienyl)hafnium dichloride; bis(pentamethylcyclopentadienyl)zirconium dimethyl; bis(1-methyl-3-n-butylcyclopentadienyl)zirconium dichloride; bis(1-methyl-3-n-butylcyclopentadienyl)zirconium dimethyl; bis(1-methyl-3-n-butylcyclopentadienyl)hafnium dichloride; bis(1-methyl-3-n-butylcyclopentadienyl)zirconium dimethyl; bis(indenyl)zirconium dichloride, bis(indenyl)zirconium dimethyl; bis(tetrahydro-1-indenyl)zirconium dichloride; bis(tetrahydro-1-indenyl)zirconium dimethyl; (n-propyl cyclopentadienyl)(pentamethyl cyclopentadienyl) zirconium dichloride; (n-propyl cyclopentadienyl)(pentamethyl cyclopentadienyl)zirconium dimethyl; Rac/meso-(1-Ethylindenyl)zirconium dichloride; Rac/meso-(1-methylindenyl)zirconium dichloride; Rac/meso-(1-propylindenyl)zirconium dichloride; Meso-(1 ethylindenyl) zirconium dichloride, and (1-Methylindenyl)(pentamethyl cyclopentadienyl).

Support Material

In embodiments of the invention herein, the catalyst systems comprise a support material. Preferably, the support material is a porous support material, for example, talc, and inorganic oxides. Other support materials include zeolites, clays, organoclays, or any other organic or inorganic support material, or mixtures thereof. As used herein, "support" and "support material" are used interchangeably.

Preferably, the support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefin such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably, $SiO_2$, $Al_2O_3$, or $SiO_2/Al_2O_3$.

It is preferred that the support material, most preferably, an inorganic oxide, has a surface area in the range of from about 10 $m^2/g$ to about 700 $m^2/g$, pore volume in the range of from about 0.1 cc/g to about 4.0 cc/g, and average particle size in the range of from about 5 µm to about 500 µm. More preferably, the surface area of the support material is in the range of from about 50 $m^2/g$ to about 500 $m^2/g$, pore volume of from about 0.5 cc/g to about 3.5 cc/g, and average particle size of from about 10 µm to about 200 µm. Most preferably, the surface area of the support material is in the range of from about 100 $m^2/g$ to about 400 $m^2/g$, pore volume from about 0.8 cc/g to about 3.0 cc/g, and average particle size is from about 5 µm to about 100 µm. The average pore size of the support material useful in the invention is in the range of from 10 to 1,000 Å, preferably, 50 to about 500 Å, and most preferably, 75 to about 350 Å. In some embodiments, the support material is a high surface area, amorphous silica (surface area ≥300 $m^2/gm$, pore volume ≥1.65 $cm^3/gm$), and is marketed under the trade names of DAVISON 952 or DAVISON 955 by the Davison Chemical Division of W. R. Grace and Company, are particularly useful. In other embodiments, DAVIDSON 948 is used.

In some embodiments of this invention, the support material may be dry, that is, free of absorbed water. Drying of the support material can be achieved by heating or calcining at about 100° C. to about 1000° C., preferably, at least about 600° C. When the support material is silica, it is typically heated to at least 200° C., preferably, about 200° C. to about 850° C., and most preferably, at about 600° C.; and for a time of about 1 minute to about 100 hours, from about 12 hours to about 72 hours, or from about 24 hours to about 60 hours. The calcined support material, preferably, has at least some reactive hydroxyl (OH) groups.

In a particularly useful embodiment, the support material is fluorided. Fluoriding agent containing compounds may be any compound containing a fluorine atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF_5$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is in the range of from 0.1 to 25 wt %, alternately from 0.19 to 19 wt %, alternately from 0.6 to 3.5 wt %, based upon the weight of the support.

The above two metal catalyst components described herein are generally deposited on the support material at a loading level of 10-100 micromoles of metal per gram of solid support; alternately 20-80 micromoles of metal per gram of solid support; or 40-60 micromoles of metal per gram of support. But greater or lesser values may be used provided that the total amount of solid complex does not exceed the support's pore volume.

Activators

The supported catalyst systems may be formed by combining the above two metal catalyst components with activators in any manner known from the literature including by supporting them for use in slurry or gas phase polymerization. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion.

Alumoxane Activators

Alumoxane activators are utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mol %, alternately the alumoxane is present at a molar ratio of aluminum to catalyst compound transition metal less than 500:1, preferably less than 300:1, preferably less than 100:1, preferably less than 1:1.

Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral byproduct from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B (C$_6$F$_5$)$_4^-$], 1-(4-(tris(pentafluoropheny orate)-2,3,5,6-tetrafluorophenyl)pyrrolidinium; and [Me$_3$NH$^+$][B(C$_6$F$_5$)$_4^-$], 1-(4-(tris(pentafluorophenyl)borate)-2,3,5,6-tetrafluorophenyl) pyrrolidinium; and sodium tetrakis(pentafluorophenyl) borate, potassium tetrakis(pentafluorophenyl)borate, 4-(tris (pentafluorophenyl)borate)-2,3,5,6-tetrafluoropyridinium, solidium tetrakis(perfluorophenyl)aluminate, potassium tetrakis(pentafluorophenyl), and N,N-dimethylanilinium tetrakis(perfluorophenyl)aluminate.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Optional Scavengers or Co-Activators

In addition to the activator compounds, scavengers, chain transfer agents or co-activators may be used. Aluminum alkyl or organoaluminum compounds which may be utilized as co-activators include, for example, trimethylaluminum, triethylaluminum, triisobutylaluminum, tri-n-hexylaluminum, tri-n-octylaluminum, and diethyl zinc.

In some embodiments, the catalyst systems will additionally comprise one or more scavenging compounds. Here, the term "scavenger" means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157; 5,241,025; and PCT Publications WO 91/09882; WO 94/03506; WO 93/14132; and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethyl aluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, [Me$_2$HNPh]$^+$[B (pfp)$_4$]$^-$ or B(pfp)$_3$ (perfluorophenyl=pfp=$C_6F_5$).

Preferred aluminum scavengers useful in the invention include those where there is oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In one aspect, aluminum containing scavengers can be represented by the formula $((R_z$—Al—$)_y$O—$)_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, more particularly from about 0.5 to about 1.

Preparation of Mixed Catalyst Systems

The above two metal compound components can be combined to form a mixed catalyst system.

The two or more metal compounds can be added together in a desired ratio when combined, contacted with an activator, or contacted with a support material or a supported activator. The metal compounds may be added to the mixture sequentially or at the same time.

More complex procedures are possible, such as addition of a first metal compound to a slurry including a support or a supported activator mixture for a specified reaction time, followed by the addition of the second metal compound solution, mixed for another specified time, after which the mixture may be recovered for use in a polymerization reactor, such as by spray drying. Lastly, another additive, such as 1-hexene in about 10 vol % can be present in the mixture prior to the addition of the first metal catalyst compound.

The first metal compound may be supported via contact with a support material for a reaction time. The resulting supported catalyst composition may then be mixed with mineral oil to form a slurry, which may or may not include an activator. The slurry may then be admixed with a second metal compound prior to introduction of the resulting mixed catalyst system to a polymerization reactor. The second metal compounds may be admixed at any point prior to introduction to the reactor, such as in a polymerization feed vessel or in-line in a catalyst delivery system.

The mixed catalyst system may be formed by combining a first metal compound (for example a metal compound useful for producing a first polymer attribute, such as a high molecular weight polymer fraction or high comonomer content) with a support and activator, desirably in a first diluent such as an alkane or toluene, to produce a supported, activated catalyst compound. The supported activated catalyst compound, either isolated from the first diluent or not, is then combined in one embodiment with a high viscosity diluent such as mineral or silicon oil, or an alkane diluent comprising from 5 to 99 wt % mineral or silicon oil to form a slurry of the supported metal compound, followed by, or simultaneous to combining with a second metal compound (for example, a metal compound useful for producing a second polymer attribute, such as a low molecular weight polymer fraction or low comonomer content), either in a diluent or as the dry solid compound, to form a supported activated mixed catalyst system ("mixed catalyst system"). The mixed catalyst system thus produced may be a supported and activated first metal compound in a slurry, the slurry comprising mineral or silicon oil, with a second metal compound that is not supported and not combined with additional activator, where the second metal compound may or may not be partially or completely soluble in the slurry. In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and typically have a molecular weight of at least 300 amu to 500 amu or more, and a viscosity at 40° C. of from 40 to 300 cSt or greater, or from 50 to 200 cSt in a particular embodiment. The term "mineral oil" includes synthetic oils or liquid polymers, polybutenes, refined naphthenic hydrocarbons, and refined paraffins known in the art, such as disclosed in Blue Book 2001, Materials, Compounding Ingredients, Machinery and Services for Rubber 189 247 (J. H. Lippincott, D. R. Smith, K. Kish & B. Gordon eds. Lippincott & Peto Inc. 2001). Preferred mineral and silicon oils useful in the present invention are those that exclude moieties that are reactive with metallocene catalysts, examples of which include hydroxyl and carboxyl groups.

The diluent may comprise a blend of a mineral, silicon oil, and/or and a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the diluent is a blend comprising mineral oil, the diluent may comprise from 5 to 99 wt % mineral oil. In some embodiments, the diluent may consist essentially of mineral oil.

In one embodiment, the first metal compound is combined with an activator and a first diluent to form a catalyst slurry that is then combined with a support material. Until such contact is made, the support particles are preferably not previously activated. The first metal compound can be in any desirable form such as a dry powder, suspension in a diluent, solution in a diluent, liquid, etc. The catalyst slurry and support particles are then mixed thoroughly, in one embodiment at an elevated temperature, so that both the first metal compound and the activator are deposited on the support particles to form a support slurry.

After the first metal compound and activator are deposited on the support, a second metal compound may then be combined with the supported first metal compound, wherein the second is combined with a diluent comprising mineral or silicon oil by any suitable means either before, simultaneous to, or after contacting the second metal compound with the supported first metal compound. In one embodiment, the first metal compound is isolated form the first diluent to a dry state before combining with the second metal compound. Preferably, the second metal compound is not activated, that is, not combined with any activator, before being combined with the supported first metal compound. The resulting solids slurry (including both the supported first and second metal compounds) is then preferably, mixed thoroughly at an elevated temperature.

A wide range of mixing temperatures may be used at various stages of making the mixed catalyst system. For example, in a specific embodiment, when the first metal compound and at least one activator, such as methylalumoxane, are combined with a first diluent to form a mixture, the mixture is preferably, heated to a first temperature of from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

Next, that mixture is combined with a support material to provide a first support slurry. The support material can be heated, or dehydrated if desired, prior to combining. In one or more embodiments, the first support slurry is mixed at a temperature greater than 50° C., preferably, greater than 70° C., more preferably, greater than 80° C. and most preferably, greater than 85° C., for a period of time from 30 seconds to 12 hours, preferably, from 1 minute to 6 hours, more preferably, from 10 minutes to 4 hours, and most preferably, from 30 minutes to 3 hours. Preferably, the support slurry is mixed for a time sufficient to provide a collection of activated support particles that have the first metal compound deposited thereto. The first diluent can then be removed from the first support slurry to provide a dried supported first catalyst compound. For example, the first diluent can be removed under vacuum or by nitrogen purge.

Next, the second metal compound is combined with the activated first metal compound in the presence of a diluent comprising mineral or silicon oil in one embodiment. Preferably, the second metal compound is added in a molar ratio to the first metal compound in the range from 1:1 to 3:1.

Most preferably, the molar ratio is approximately 1:1. The resultant slurry (or first support slurry) is preferably, heated to a first temperature from 25° C. to 150° C., preferably, from 50° C. to 125° C., more preferably, from 75° C. to 100° C., most preferably, from 80° C. to 100° C. and stirred for a period of time from 30 seconds to 12 hours, preferably, from 1 minute to 6 hours, more preferably, from 10 minutes to 4 hours, and most preferably, from 30 minutes to 3 hours.

The first diluent is an aromatic or alkane, preferably, hydrocarbon diluent having a boiling point of less than 200° C. such as toluene, xylene, hexane, etc., may be removed from the supported first metal compound under vacuum or by nitrogen purge to provide a supported mixed catalyst system. Even after addition of the oil and/or the second (or other) catalyst compound, it may be desirable to treat the slurry to further remove any remaining solvents such as toluene. This can be accomplished by an Na purge or vacuum, for example. Depending upon the level of mineral oil added, the resultant mixed catalyst system may still be a slurry or may be a free flowing powder that comprises an amount of mineral oil. Thus, the mixed catalyst system, while a slurry of solids in mineral oil in one embodiment, may take any physical form such as a free flowing solid. For example, the mixed catalyst system may range from 1 to 99 wt % solids content by weight of the mixed catalyst system (mineral oil, support, all catalyst compounds and activator(s)) in one embodiment. The metallocene compound may be the first or second compound, typically the second compound.

Polymerization Process

In embodiments herein, the invention relates to polymerization processes where monomer (such as ethylene), and, optionally, comonomer (such as hexene), are contacted with a supported catalyst system comprising a bridged group 4 (such as Hf) metallocene compound, an unbridged group 4 (such as Zr) metallocene compound, an activator, and a support material as described above.

Monomers useful herein include substituted or unsubstituted $C_2$ to $C_{40}$ alpha olefins, preferably, $C_2$ to $C_{20}$ alpha olefins, preferably, $C_2$ to $C_{12}$ alpha olefins, preferably, ethylene, propylene, butene, pentene, hexene, heptene, octene, nonene, decene, undecene, dodecene and isomers thereof. In a preferred embodiment of the invention, the monomers comprise ethylene and, optional, comonomers comprising one or more $C_3$ to $C_{40}$ olefins, preferably, $C_4$ to $C_{20}$ olefins, or preferably, $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Exemplary $C_3$ to $C_{40}$ comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably, hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives.

In a preferred embodiment one or more dienes are present in the polymer produced herein at up to 10 wt %, preferably, at 0.00001 to 1.0 wt %, preferably, 0.002 to 0.5 wt %, even more preferably, 0.003 to 0.2 wt %, based upon the total weight of the composition. In some embodiments 500 ppm or less of diene is added to the polymerization, preferably, 400 ppm or less, preferably, or 300 ppm or less. In other embodiments, at least 50 ppm of diene is added to the polymerization, or 100 ppm or more, or 150 ppm or more.

Preferred diolefin monomers useful in this invention include any hydrocarbon structure, preferably, $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably, those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a particularly preferred embodiment, the process of the invention relates to the polymerization of ethylene and at least one comonomer having from 3 to 8 carbon atoms, preferably, 4 to 8 carbon atoms. Particularly, the comonomers are propylene, 1-butene, 4-methyl-1-pentene, 3-methyl-1-pentene, 1-hexene and 1-octene, the most preferred being 1-hexene, 1-butene and 1-octene.

In a particularly preferred embodiment, the process of the invention relates to the polymerization of one or more monomers selected from the group consisting of propylene, 1-butene, 1-pentene, 3-methyl-1-pentene, 4-methyl-1-pentene, 1-hexene, 1-octene, 1-decene, and combinations thereof.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Gas phase polymerization processes and slurry processes are preferred. (A homogeneous polymerization process is a process where at least 90 wt % of the product is soluble in the reaction media.) A bulk homogeneous process is particularly preferred. (A bulk process is a process where monomer concentration in all feeds to the reactor is 70 vol % or more.) Alternately, no solvent or diluent is present or added in the reaction medium (except for the small amounts used as the carrier for the catalyst system or other additives, or amounts typically found with the monomer; e.g., propane in propylene).

In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorided $C_{4-10}$ alkanes, chlorobenzene, and aromatic and alkylsubstituted aromatic compounds, such as benzene, toluene, mesitylene, and xylene. Suitable solvents also include liquid olefins, which may act as monomers or comonomers, including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably, aromatics are present in the solvent at less than 1 wt %, preferably, less than 0.5 wt %, preferably, less than 0 wt % based upon the weight of the solvents.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process must be operated above the reaction diluent critical temperature and pressure. Preferably, a hexane or an isobutane medium is employed.

Polyolefin Products

This invention also relates to compositions of matter produced by the methods described herein.

In a preferred embodiment, the process described herein produces ethylene homopolymers or ethylene copolymers, such as ethylene-alphaolefin (preferably $C_3$ to $C_{20}$) copolymers (such as ethylene-butene copolymers, ethylene-hexene and/or ethylene-octene copolymers) having an Mw/Mn of greater than 1 to 4 (preferably greater than 1 to 3).

Likewise, the process of this invention produces ethylene copolymers. In a preferred embodiment, the copolymers produced herein have from 0 to 25 mol % (alternately from 0.5 to 20 mol %, alternately from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene).

In a preferred embodiment, the monomer is ethylene and the comonomer is hexene, preferably from 1 to 15 mol % hexene, alternately 1 to 10 mol %.

In particular this invention relates to an in-situ ethylene polymer composition having: 1) at least 50 mol % ethylene; and 2) a density of 0.91 g/cc or more, preferably 0.935 g/cc or more (ASTM 1505). Preferably, the copolymer has higher comonomer (e.g., hexene) content in the higher molecular weight (Mw) component of the resin as compared to the lower molecular weight (Mw) component, preferably at least 10% higher, preferably at least 20% higher, preferably at least 30% higher as determined by GPC-4D. The dividing line between higher and lower Mw is the midpoint between the Mw's of two polymers each made using the same polymerization conditions as the product made using the two catalysts on a support, except that the first polymer is made without the catalyst represented by formula (A) and the second polymer is made without the catalyst represented by formula (B).

The copolymer produced herein typically has a composition distribution breadth $T_{75}$-$T_{25}$, as measured by TREF, that is greater than 20° C., preferably greater than 30° C., preferably greater than 40° C. The $T_{75}$-$T_{25}$ value represents the homogeneity of the composition distribution as determined by temperature rising elution fractionation. A TREF curve is produced as described below. Then the temperature at which 75% of the polymer is eluted is subtracted from the temperature at which 25% of the polymer is eluted, as determined by the integration of the area under the TREF curve. The $T_{75}$-$T_{25}$ value represents the difference. The closer these temperatures comes together, the narrower the composition distribution.

Typically, the polymers produced herein have an Mw of 5,000 to 1,000,000 g/mol (preferably 25,000 to 750,000 g/mol, preferably 50,000 to 500,000 g/mol), and/or an Mw/Mn of greater than 1 to 40 (alternately 1.2 to 20, alternately 1.3 to 10, alternately 1.4 to 5, 1.5 to 4, alternately 1.5 to 3) as determined by GPC-4D.

In a preferred embodiment, the polymer produced herein has a unimodal or multimodal molecular weight distribution as determined by Gel Permeation Chromatography (GPC). By "unimodal" is meant that the GPC trace has one peak or two or more inflection points. By "multimodal" is meant that the GPC trace has at least two peaks or more than 2 inflection points. An inflection point is that point where the second derivative of the curve changes in sign (e.g., from negative to positive or vice versa).

Usefully, in a preferred embodiment, the polymer produced herein has a bimodal molecular weight distribution as determined by Gel Permeation Chromatography (GPC). By "bimodal" is meant that the GPC trace has two peaks or at least 4 inflection points.

If indicated, modality, Mw, Mn, Mz, MWD, g value and $g'_{vis}$ can be determined by GPC-3D using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, 6812-6820, (2001) and references therein. Three Polymer Laboratories PLgel 10 mm Mixed-B LS columns are used. The nominal flow rate is 0.5 cm$^3$/min, and the nominal injection volume is 300 μL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 μm glass pre-filter and subsequently through a 0.1 μm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI, and (dn/dc) is the refractive index increment for the system. For, the refractive index, n=1.500 for TCB at 145° C. and λ=690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/cm$^3$, molecular weight is expressed in g/mole, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers and 0.1 otherwise, P(θ) is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. For the refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2,$$

where c is concentration and was determined from the DRI output.

The branching index ($g'_{vis}$) is calculated using the output of the above SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits. The branching index $g'_{vis}$ is defined as:

$$g'vis = \frac{[\eta]_{avg}}{kM_v^\alpha},$$

where, for purpose of this invention and claims thereto, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis.

In another embodiment, the polymer produced herein has two peaks in the TREF measurement (see below). Two peaks in the TREF measurement as used in this specification and the appended claims means the presence of two distinct normalized IR response peaks in a graph of normalized IR response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bi-modal composition distribution (CD). An alternate method for TREF measurement can be used if the method below does not show two peaks, i.e., see B.

Monrabal, "Crystallization Analysis Fractionation: A New Technique for the Analysis of Branching Distribution in Polyolefins," Journal of Applied Polymer Science, Vol. 52, 491-499 (1994).

TREF Method

Temperature Rising Elution Fractionation (TREF) analysis is done using a Crystallization Elution Fractionation (CEF) instrument from Polymer Char, S.A., Valencia, Spain. The principles of CEF analysis and a general description of the particular apparatus used are given in the article Monrabal, B. et al. Crystallization Elution Fractionation. A New Separation Process for Polyolefin Resins. *Macromol. Symp.* 2007, 257, 71. In particular, a process conforming to the "TREF separation process" shown in FIG. 1a of this article, in which Fc=0, was used. Pertinent details of the analysis method and features of the apparatus used are as follows.

The solvent used for preparing the sample solution and for elution was 1,2-Dichlorobenzene (ODCB) which was stabilized by dissolving 1.6 g of 2,6-bis(1,1-dimethylethyl)-4-methylphenol (butylated hydroxytoluene) in a 4-L bottle of fresh solvent at ambient temperature. The stabilized solvent was then filtered using a 0.1-μm Teflon filter (Millipore). The sample (6-10 mg) to be analyzed was dissolved in 8 ml of ODCB metered at ambient temperature by stirring (Medium setting) at 150° C. for 90 min. A small volume of the polymer solution was first filtered by an inline filter (stainless steel, 10 μm), which is back-flushed after every filtration. The filtrate was then used to completely fill a 200-μl injection-valve loop. The volume in the loop was then introduced near the center of the CEF column (15-cm long SS tubing, 3/8" o.d., 7.8 mm i.d.) packed with an inert support (SS balls) at 140° C., and the column temperature was stabilized at 125° C. for 20 min. The sample volume was then allowed to crystallize in the column by reducing the temperature to 0° C. at a cooling rate of 1° C./min. The column was kept at 0° C. for 10 min before injecting the ODCB flow (1 ml/min) into the column for 10 min to elute and measure the polymer that did not crystallize (soluble fraction). The wide-band channel of the infrared detector used (Polymer Char IR5) generates an absorbance signal that is proportional to the concentration of polymer in the eluting flow. A complete TREF curve was then generated by increasing the temperature of the column from 0 to 140° C. at a rate of 2° C./min while maintaining the ODCB flow at 1 ml/min to elute and measure the concentration of the dissolving polymer.

GPC 4D Procedure: Molecular Weight, Comonomer Composition and Long Chain Branching Determination by GPC-IR Hyphenated with Multiple Detectors Unless otherwise indicated, the distribution and the moments of molecular weight (Mw, Mn, Mw/Mn, etc.), the comonomer content (C2, C3, C6, etc.) and the branching index (g'vis) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=/βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha+1} + \frac{\alpha_{PS}+1}{\alpha+1}\log M_{PS},$$

where the variables with subscript "PS" stand for polystyrene while those without a subscript are for the test samples. In this method, $\alpha_{PS}=0.67$ and $K_{PS}=0.000175$ while $\alpha$ and K are for other materials as calculated and published in literature (Sun, T. et al. *Macromolecules* 2001, 34, 6812), except that for purposes of this invention and claims thereto, $\alpha=0.695$ and K=0.000579 for linear ethylene polymers, $\alpha=0.705$ and K=0.0002288 for linear propylene polymers, $\alpha=0.695$ and K=0.000181 for linear butene polymers, $\alpha$ is 0.695 and K is 0.000579*(1-0.0087*w2b+0.000018*(w2b)^2) for ethylene-butene copolymer where w2b is a bulk weight percent of butene comonomer, $\alpha$ is 0.695 and K is 0.000579*(1-0.0075*w2b) for ethylene-hexene copolymer where w2b is a bulk weight percent of hexene comonomer, and $\alpha$ is 0.695 and K is 0.000579*(1-0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to CH$_2$ and CH$_3$ channel calibrated with a series of PE and PP homo/copolymer standards whose nominal value are predetermined by NMR or FTIR. In particular, this provides the methyls per 1000 total carbons (CH$_3$/1000TC) as a function of molecular weight. The short-chain branch (SCB) content per 1000TC (SCB/1000TC) is then computed as a function of molecular weight by applying a chain-end correction to the CH$_3$/1000TC function, assuming each chain to be linear and terminated by a methyl group at each end. The weight % comonomer is then obtained from the following expression in which f is 0.3, 0.4, 0.6, 0.8, and so on for C3, C4, C6, C8, and so on co-monomers, respectively:

$w2=f*SCB/1000TC.$

The bulk composition of the polymer from the GPC-IR and GPC-4D analyses is obtained by considering the entire signals of the CH₃ and CH₂ channels between the integration limits of the concentration chromatogram. First, the following ratio is obtained $$\text{Bulk IR ratio} = \frac{\text{Area of CH}_3 \text{ signal within integration limits}}{\text{Area of CH}_2 \text{ signal within integration limits}}.$$

Then the same calibration of the CH₃ and CH₂ signal ratio, as mentioned previously in obtaining the CH₃/1000TC as a function of molecular weight, is applied to obtain the bulk CH₃/1000TC. A bulk methyl chain ends per 1000TC (bulk CH3end/1000TC) is obtained by weight-averaging the chain-end correction over the molecular-weight range. Then $w2b = f^* \text{bulk CH}_3/1000\text{TC}$, bulk SCB/1000TC=bulk CH₃/1000TC−bulk CH₃end/1000TC, and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits. The branching index $g'_{vis}$ is defined as $$g'_{vis} = \frac{[\eta]_{avg}}{KM_v^\alpha},$$

where $M_v$ is the viscosity-average molecular weight based on molecular weights determined by LS analysis and the K and α are for the reference linear polymer, which are, for purposes of this invention and claims thereto, α=0.695 and K=0.000579 for linear ethylene polymers, α=0.705 and K=0.0002288 for linear propylene polymers, α=0.695 and K=0.000181 for linear butene polymers, a is 0.695 and K is 0.000579*(1−0.0087*w2b+0.000018*(w2b)^2) for ethylene-butene copolymer where w2b is a bulk weight percent of butene comonomer, a is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer C3, C4, C6, C8, etc.), as a function of molecular weight, where x2 is obtained from the following expression in which n is the number of carbon atoms in the comonomer (3 for C3, 4 for C4, 6 for C6, etc.):

$$x2 = -\frac{200\ w2}{-100n - 2\ w2 + n\ w2}.$$

Then the molecular-weight distribution, W(z) where $z=\log_{10} M$, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $1 = \int_{-\infty}^{\infty} W'Dz$, and a modified weight-average molecular weight ($M_w'$) is calculated over the effectively reduced range of molecular weights as follows:

$M_w' = \int_{-\infty}^{\infty} 10^z * W' dz.$

The RCI,m is then computed as $\text{RCI},m = \int_{-\infty}^{\infty} x2(10^z - M_w')W'dz.$ A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^z - M'_w)W'dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)},$$

$$CDR\text{-}2, w = \frac{w2(Mz)}{w2\left(\frac{Mw+Mn}{2}\right)},$$

$$CDR\text{-}3, w = \frac{w2\left(\frac{Mz+Mw}{2}\right)}{w2\left(\frac{Mw+Mn}{2}\right)},$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as:

$$CDR\text{-}1, m = \frac{x2(Mz)}{x2(Mw)},$$

$$CDR\text{-}2, m = \frac{x2(Mz)}{x2\left(\frac{Mw+Mn}{2}\right)},$$

$$CDR\text{-}3, m = \frac{x2\left(\frac{Mz+Mw}{2}\right)}{x2\left(\frac{Mw+Mn}{2}\right)},$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

An "in-situ polymer composition" (also referred to as an "in-situ blend" or a "reactor blend") is the composition which is the product of a polymerization with two catalyst compounds in the same reactor described herein. Without wishing to be bound by theory it is thought that the two catalyst compounds produce a reactor blend (i.e., an interpenetrating network) of two (or more) components made in the same reactors (or reactions zones) with the two catalysts. In the literature, these sorts of compositions may be referred to as reactor blends, although the term may not be strictly accurate since there may be polymer species comprising components produced by each catalyst compound that are not technically a blend.

An "ex-situ blend" is a blend which is a physical blend of two or more polymers synthesized independently and then subsequently blended together typically using a melt-mixing process, such as an extruder. An ex-situ blend is distinguished by the fact that the polymer components are collected in solid form after exiting their respective synthesis processes, and then combined to form the blend; whereas for an in-situ polymer composition, the polymer components are prepared within a common synthesis process and only the combination is collected in solid form.

In any embodiment described herein, the polymer composition produced is an in-situ polymer composition.

In any embodiment of the invention described herein, the polymer produced is an in-situ polymer composition having an ethylene content of 70 wt % or more, preferably 80 wt % or more, preferably 90 wt % or more and/or a density of 0.910 or more, alternately 0.93 g/cc or more; alternately 0.935 g/cc or more, alternately 0.938 g/cc or more.

In any embodiment of the invention described herein, the polymer produced is an in-situ polymer composition having a density of 0.910 g/cc or more, alternately from 0.935 to 0.960 g/cc.

In any embodiment of the invention described herein, the polymer produced by the processes described herein comprises ethylene and one or more comonomers and the polymer has: 1) an RCI,m greater than 30 (alternately greater than 30 to 50), an Mw/Mn of greater than 3, and optionally a $T_{75}$-$T_{25}$ of 15 to 20° C.; or 2) an RCI,m greater than 50 (alternately greater than 80), an Mw/Mn of greater than 5 (alternately from 5 to 10), and optionally a $T_{75}$-$T_{25}$ of 25 to 45° C.

In any embodiment of the invention described herein when:

1) the bridged group 4 metallocene compound (A) is run under the same polymerization conditions as a supported two catalyst composition described herein, except that the unbridged metallocene compound (B) is absent, a polymer having an RCI,m of 20 or more is produced, and 2) the unbridged metallocene compound (B) is run under the same polymerization conditions as step 1), except that the bridged group 4 metallocene compound (A) is absent, a polymer having an RCI,m of less than zero is produced.

In any embodiment of the invention described herein, a linear low density polyethylene may be produced by using the supported catalyst systems (C) described herein (e.g., having activator and two catalysts (A) and (B) supported on the same support) where the LLDPE has: a) an RCI,m greater than 30 (alternately greater than 30 to 50), an Mw/Mn of greater than 3 to less than 5, and optionally a $T_{75}$-$T_{25}$ of 15-20° C.; or b) an RCI,m greater than 50 (alternately greater than 80) and an Mw/Mn of greater than 5 (optionally of greater than 5 to 10), and optionally a $T_{75}$-$T_{25}$ of 25-45° C., provided that:

1) when the supported bridged group 4 metallocene catalyst compound (A) is run under the same polymerization conditions as the supported catalyst system (C) except that the unbridged metallocene catalyst compound (B) is absent, an ethylene polymer is produced having an RCI,m greater than 20; and 2) when the supported unbridged metallocene catalyst compound (B) is run under the same conditions as step 1) except that the bridged group 4 metallocene catalyst compound (A) is absent, an ethylene polymer is produced having a negative RCI,m.

To obtain polymers having higher RCI,m's (such as 50 and above) select bridged catalysts compounds represented by formula (A) that produce high comonomer content and or high Mw/Mn.

End Uses

The multi-modal polyolefin produced by the processes disclosed herein and blends thereof are useful in such forming operations as film, sheet, and fiber extrusion and co-extrusion as well as blow molding, injection molding, and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Specifically, any of the foregoing polymers, such as the foregoing ethylene copolymers or blends thereof, may be used in mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents.

Blends

The polymers produced herein may be further blended with additional ethylene polymers (referred to as "second ethylene polymers" or "second ethylene copolymers") and use in film, molded part and other typical polyethylene applications.

In one aspect of the invention, the second ethylene polymer is selected from ethylene homopolymer, ethylene copolymers, and blends thereof. Useful second ethylene copolymers can comprise one or more comonomers in addition to ethylene and can be a random copolymer, a statistical copolymer, a block copolymer, and/or blends thereof. The method of making the second ethylene polymer is not critical, as it can be made by slurry, solution, gas phase, high pressure or other suitable processes, and by using catalyst systems appropriate for the polymerization of polyethylene, such as Ziegler-Natta-type catalysts, chromium catalysts, metallocene-type catalysts, other appropriate catalyst systems or combinations thereof, or by free-radical polymerization. In a preferred embodiment, the second ethylene polymers are made by the catalysts, activators and processes described in U.S. Pat. Nos. 6,342,566; 6,384,142; 5,741,563; PCT Publications WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000). Additional useful second ethylene polymers and copolymers are described at paragraph [00118] to [00126] at pages 30 to 34 of PCT/US2016/028271, filed Apr. 19, 2016.

EXPERIMENTAL

Test Methods $^1$H NMR $^1$H NMR data was collected at 120° C. using a 10 mm CryoProbe with a Bruker spectrometer at a $^1$H frequency of 400 MHz (available from Bruker Corporation, United Kingdom). Data were recorded using a maximum pulse width of 45°, 5 seconds between pulses and signal averaging 512 transients. Samples were prepared by dissolving 80 mg of sample in 3 mL of solvent heated at 140° C. Peak assignments are determined referencing the solvent of tetrachloroethane-1,2 $d_2$ at 5.98 ppm.

GPC 4D Procedure

Unless otherwise indicated, the distribution and the moments of molecular weight (Mw, Mn, Mz, Mw/Mn, etc.), the comonomer content (C2, C3, C6, etc.) and the branching index (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. Given amount of polymer sample is weighed and sealed in a standard vial with 80-4 flow marker (Heptane) added to it. After loading the vial in the autosampler, polymer is automatically dissolved in the instrument with 8 ml added TCB solvent. The polymer is dissolved at 160° C. with continuous shaking for about 1 hour for most polyethylene samples or 2 hours for polypropylene samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: $c=\beta I$, where $\beta$ is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha+1} + \frac{\alpha_{PS}+1}{\alpha+1}\log M_{PS},$$

where the variables with subscript "PS" stand for polystyrene while those without a subscript are for the test samples. In this method, $\alpha_{PS}=0.67$ and $K_{PS}=0.000175$, while α and K for other materials are as calculated and published in literature (Sun, T. et al. *Macromolecules* 2001, 34, 6812), except that for purposes of this invention and claims thereto, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, a is 0.695 and K is $0.000579*(1-0.0087*w2b+0.000018*(w2b)^2)$ for ethylene-butene copolymer where w2b is a bulk wt % of butene comonomer, a is 0.695 and K is $0.000579*(1-0.0075*w2b)$ for ethylene-hexene copolymer where w2b is a bulk wt % of hexene comonomer, and α is 0.695 and K is $0.000579*(1-0.0077*w2b)$ for ethylene-octene copolymer where w2b is a bulk wt % of octene comonomer. Concentrations are expressed in $g/cm^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3/1000TC$) as a function of molecular weight. The short-chain branch (SCB) content per 1000TC (SCB/1000TC) is then computed as a function of molecular weight by applying a chain-end correction to the $CH_3/1000TC$ function, assuming each chain to be linear and terminated by a methyl group at each end. The wt % comonomer is then obtained from the following expression in which f is 0.3, 0.4, 0.6, 0.8, and so on for C3, C4, C6, C8, and so on co-monomers, respectively:

$w2 = f*SCB/1000TC.$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $w2b = f*\text{bulk CH3/1000TC},$ bulk SCB/1000TC = bulk CH3/1000TC − bulk CH3end/1000TC, and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2=0.0015$; for analyzing ethylene-butene copolymers, dn/dc=0.1048*(1−0.00126*w2) ml/mg and $A_2=0.0015$ where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits. The branching index $g'_{vis}$ is defined as $$g'_{vis} = \frac{[\eta]_{avg}}{KM_v^\alpha},$$

where $M_V$ is the viscosity-average molecular weight based on molecular weights determined by LS analysis and the K and a are for the reference linear polymer, which are, for purposes of this invention and claims thereto, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, α is 0.695 and K is $0.000579*(1-0.0087*w2b+0.000018*(w2b)^2)$ for ethylene-butene copolymer where w2b is a bulk weight percent of butene comonomer, α is 0.695 and K is 0.000579*(1-0.0075*w2b) for ethylene-hexene copolymer where w2b is a bulk weight percent of hexene comonomer, and α is 0.695 and K is 0.000579*(1-0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

The reversed-co-monomer index (RCI,m) is computed from x2 (mol % co-monomer C3, C4, C6, C8, etc.), as a function of molecular weight, where x2 is obtained from the following expression in which n is the number of carbon atoms in the comonomer (3 for C3, 4 for C4, 6 for C6, etc.):

$$x2 = -\frac{200\ w2}{-100n - 2\ w2 + n\ w2}.$$

Then the molecular-weight distribution, W(z) where z=log$_{10}$ M, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W' dz,$$

and a modified weight-average molecular weight (M$_w$') is calculated over the effectively reduced range of molecular weights as follows:

$$M_w' = \int_{-\infty}^{\infty} 10^z * W' dz$$

The RCI,m is then computed as $$\text{RCI},m = \int_{-\infty}^{\infty} x2(10^z - M_w') W' dz.$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^z - M_w') W' dz.$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR\text{-}1, w = \frac{w2(Mz)}{w2(Mw)},$$

$$CDR\text{-}2, w = \frac{w2(Mz)}{w2\left(\frac{Mw + Mn}{2}\right)},$$

$$CDR\text{-}3, w = \frac{w2\left(\frac{Mz + Mw}{2}\right)}{w2\left(\frac{Mw + Mn}{2}\right)},$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as $$CDR\text{-}1, m = \frac{x2(Mz)}{x2(Mw)},$$

$$CDR\text{-}2, m = \frac{x2(Mz)}{x2\left(\frac{Mw + Mn}{2}\right)},$$

$$CDR\text{-}3, m = \frac{x2\left(\frac{Mz + Mw}{2}\right)}{x2\left(\frac{Mw + Mn}{2}\right)},$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

All molecular weights are weight average (Mw) unless otherwise noted. All molecular weights are reported in g/mol unless otherwise noted.

Melt index (MI) also referred to as I2, reported in g/10 min, is determined according to ASTM D1238, 190° C., 2.16 kg load.

High load melt index (HLMI) also referred to as I21, reported in g/10 min, is determined according to ASTM D1238, 190° C., 21.6 kg load.

Melt index ratio (MIR) is MI divided by HLMI as determined by ASTM D1238.

Catalyst Compounds

Complex 1

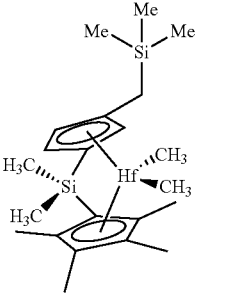

Me₂Si(Me₄Cp)(3-CH₂SiMe₃Cp)HfMe₂

Complex 2

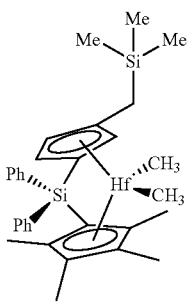

Ph₂Si(Me₄Cp)(3-CH₂SiMe₃Cp)HfMe₂

Complex 3

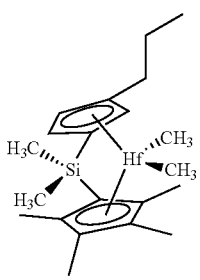

Me₂Si(Me₄Cp)(3-nPrCp)HfMe₂

Complex 4

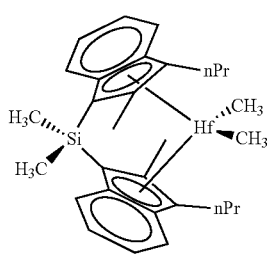

Me₂Si(2-Me, 3-n-Pr-Ind)₂HfMe₂

Experimental

All manipulations were performed in an inert N₂ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (2.5 M solution in hexane), dimethylsilyl dichloride (Me₂SiCl₂), diphenylsilyl dichloride (Ph₂SiCl₂) methylmagnesium bromide (3.0 M solution in diethyl ether) and silver trifluoromethanesulfonate (AgOTf) were purchased from Sigma-Aldrich. Hafnium tetrachloride (HfCl₄) 99+% and (trimethylsilyl)methyl trifluoromethanesulfonate were procured from Strem Chemicals and TCI America, respectively, and used as received. Potassium cyclopentadienide (KCp) was prepared according to the procedure described in Stadelhofer, J.; Weidlein, J.; Haaland, A. *J. Organomet. Chem.* 1975, 84, C1-C4. The ¹H NMR measurements were obtained as described above.

Synthesis of (Trimethylsilyl)methylcyclopentadiene, (Me₃Si)CH₂CpH

A neat (trimethylsilyl)methyl trifluoromethanesulfonate (10.57 g, 44.7 mmol) was dissolved in 150 mL of diethyl ether and cooled to −25° C., to this a solid potassium cyclopentadienide (4.66 g, 44.7 mmol) was slowly added over a period of 5-10 minutes. The resulting mixture was stirred 5 hours at room temperature. Volatiles from the reaction mixture were carefully removed under dynamic vacuum to avoid evaporating the volatile (trimethylsilyl)methylcyclopentadiene, (Me₃Si)CH₂CpH. The reaction flask (250 mL round bottom flask) and frit with celite were weighted to calculate yield of the product after extraction. The crude materials were extracted into pentane (3×10 mL) and used without any further purification. Based on above mathematical method, the yield is calculated as 5.55 g (81.6%). The ¹H NMR spectrum was recorded for the crude material to ensure the product formation. ¹H NMR (400 MHz, C₆D₆): δ −0.05 (9H, s, Si—CH₃), 1.77 (2H, d, $J_{HH}$=1.2 Hz, Me₃Si—CH₂), 2.83 (1H, sex, $J_{HH}$=1.5 Hz, Cp-CH), 5.80-6.49 (4H, m, Cp-CH) ppm.

Synthesis of Lithium (trimethylsilyl)methylcyclopentadienide, (Me₃Si)CH₂CpLi A hexane solution of n-butyl lithium (14.6 mL, 36.5 mmol) was added drop-wise to a precooled solution (pentane and diethyl ether, 50/50 mL) of (Me₃Si)CH₂CpH (5.55 g, 36.5 mmol) over a period of 15-20 minutes at −25° C. The resulting mixture was gradually brought to room temperature and then continuously stirred overnight. Volatiles were removed in vacuo and remaining crude materials were thoroughly washed with pentane. The final materials were dried under vacuum to obtain a colorless crystalline solid of (Me₃Si)CH₂CpLi in 5.75 g (99.7%) yield. ¹H NMR (400 MHz, THF-d₈): δ−0.09 (9H, s, Si—CH₃), 1.84 (2H, s, Me₃Si—CH₂), 5.36 (2H, t, $J_{HH}$=2.6 Hz, Cp-CH), 5.47 (2H, t, $J_{HH}$=2.6 Hz, Cp-CH) ppm.

Synthesis of Dimethylsilyl-(2,3,4,5-tetramethyl-2,4-cyclopentadien-1-yl) (trimethylsilylmethylcyclopentadiene), Me₂Si(Me₄CpH)(Me₃SiCH₂CpH)

A solid Me₃SiCH₂CpLi (500 mg, 3.2 mmol) was added to a precooled ethereal solution of Me₂Si(Me₄CpH)C₁ (680 mg, 3.2 mmol) at −25° C. The resulting mixture was stirred overnight at room temperature to ensure completion of the reaction. Volatiles from the reaction mixture were removed in vacuo and subsequently triturated with pentane. The crude materials were extracted into pentane and followed by solvent removal under vacuum afforded a thick yellow oil of Me₂Si(Me₄CpH)(Me₃SiCH₂CpH) in 670 mg (64.1%) yield. ¹H NMR (400 MHz, C₆D₆): δ 0.06 (6H, s, SiMe₂-CH₃), 0.14 (9H, s, SiMe₃-CH₃), 1.71 (6H, s, Cp-CH₃), 1.83 (2H, s, Me$_3$Si—CH$_2$), 1.92 (6H, s, Cp-CH$_3$), 2.81 (1H, bs, Cp-CH), 2.89 (1H, bs, Cp-CH), 5.90-6.50 (6H, m, Cp-CH) ppm.

Synthesis of Lithium dimethylsilyl-(tetramethylcyclopentadienide)-(trimethylsilylmethylcyclopentadienide), Me$_2$Si(Me$_4$Cp)(Me$_3$SiCH$_2$Cp)Li$_2$ A hexane solution of n-butyl lithium (1.6 mL, 4.0 mmol, 2.5 M solution) was added drop wise to a precooled solution of Me$_2$Si(Me$_4$CpH)(Me$_3$SiCH$_2$CpH) (650 mg, 2.0 mmol) in 10 mL of THF over a period of 5-10 minutes at −25° C. The resulting mixture was gradually warmed to room temperature and then continuously stirred overnight. Volatiles from the reaction mixture were removed in vacuo, and triturated with pentane. The crude materials were thoroughly washed with pentane to remove any soluble impurities, and dried under vacuum to obtain the colorless crystalline solid of Me$_2$Si(Me$_4$Cp)(Me$_3$SiCH$_2$Cp)Li$_2$ in 440 mg (64.9%) yield. $^1$H NMR (400 MHz, THF-d$_8$): δ −0.11 (9H, s, SiMe$_3$-CH$_3$), 0.12 (3H, s, SiMe$_2$-CH$_3$), 0.33 (3H, s, SiMe$_2$-CH$_3$), 1.83 (2H, s, Me$_3$Si—CH$_2$), 1.85 (6H, s, Cp-CH$_3$), 2.00 (6H, s, Cp-CH$_3$), 5.46 (1H, t, J$_{HH}$=2.4 Hz, Cp-CH), 5.58 (1H, t, J$_{HH}$=2.0 Hz, Cp-CH), 5.65 (1H, bs, Cp-CH) ppm.

Synthesis of Dimethylsilyl-(tetramethylcyclopentadienide)-(trimethylsilylmethylcyclopentadienide) hafnium dichloride, Me$_2$Si(Me$_4$Cp)-(Me$_3$SiCH$_2$Cp)HfCl$_2$ A solid HfCl$_4$ (410 mg, 1.3 mmol) was added to a precooled ethereal (10 mL) solution of Me$_2$Si(Me$_4$Cp)(Me$_3$SiCH$_2$Cp)Li$_2$ (440 mg, 1.3 mmol) at −25° C. The resulting mixture was stirred overnight at room temperature. Insoluble materials were filtered out and volatiles from the filtrate were removed in vacuo. The crude materials were washed with cold pentane to remove soluble impurities. The resulting materials were dried under vacuum to obtain the pale yellow crystalline solid of Me$_2$Si(Me$_4$Cp)(Me$_3$SiCH$_2$Cp)HfCl$_2$ in 280 mg (37.5%) yield. $^1$H NMR (400 MHz, CD$_2$Cl$_2$): δ−0.03 (9H, s, SiMe$_3$-CH$_3$), 0.79 (3H, s, SiMe$_2$-CH$_3$), 0.82 (3H, s, SiMe$_2$-CH$_3$), 1.92 (3H, s, Cp-CH$_3$), 1.99 (3H, s, Cp-CH$_3$), 2.03 (3H, s, Cp-CH$_3$), 2.07 (3H, s, Cp-CH$_3$), 2.12 (2H, d, J$_{HH}$=2.2 Hz, Me$_3$Si—CH$_2$), 5.03 (1H, t, J$_{HH}$=2.4 Hz, Cp-CH), 5.56 (1H, t, J$_{HH}$=2.7 Hz, Cp-CH), 6.32 (1H, t, J$_{HH}$=2.2 Hz, Cp-CH) ppm.

Synthesis of Complex 1, Dimethylsilyl-(tetramethylcyclopentadienide) (trimethylsilylmethylcyclopentadienide) hafnium dimethyl, Me$_2$Si(Me$_4$Cp)(Me$_3$SiCH$_2$Cp)HfMe$_2$ An ethereal solution of MeMgBr (0.33 mL, 0.98 mmol) was added drop wise to a precooled diethyl ether solution of Me$_2$Si(Me$_4$Cp)(Me$_3$SiCH$_2$Cp)HfCl$_2$ (280 mg, 0.48 mmol) over a period of 3-5 minutes at −25° C. The resulting mixture was stirred overnight at room temperature to ensure completion of the reaction. Volatiles were removed in vacuo, and the crude materials were then extracted into pentane. Solvent removal afforded a sticky yellow material of Me$_2$Si(Me$_4$Cp)(Me$_3$SiCH$_2$Cp)HfMe$_2$ in 170 mg (66%) yield. $^1$H NMR (400 MHz, C$_6$D$_6$): δ−0.46 (3H, s, Hf—CH$_3$), δ−0.43 (3H, s, Hf—CH$_3$), 0.03 (9H, s, SiMe$_3$-CH$_3$), 0.41 (3H, s, SiMe$_2$-CH$_3$), 0.39 (3H, s, SiMe$_2$-CH$_3$), 1.71 (3H, s, Cp-CH$_3$), 1.76 (3H, s, Cp-CH$_3$), 2.00 (3H, s, Cp-CH$_3$), 2.02 (3H, s, Cp-CH$_3$), 2.06 (2H, bs, Me$_3$Si—CH$_2$), 4.99 (1H, t, J$_{HH}$=2.3 Hz, Cp-CH), 5.29 (1H, t, J$_{HH}$=2.6 Hz, Cp-CH), 6.33 (1H, t, J$_{HH}$=2.3 Hz, Cp-CH) ppm.

Synthesis of Diphenylsilyl-(2,3,4,5-tetramethyl-2,4-cyclopentadien-1-yl) chloride, Ph$_2$Si(Me$_4$CpH)Cl A neat Ph$_2$SiCl$_2$ (10.188 g, 40.24 mmol) was dissolved in 200 mL of THF and cooled to −25° C., and to this a solid Me$_4$Cp-Li (5.156 g, 40.24 mmol) was added over a period of 5-10 minutes. The resulting mixture was stirred overnight at room temperature. Volatiles from the reaction mixture were removed in vacuo and triturated with hexane. The crude materials were extracted into hexane and further solvent removal in reduced pressure resulted a yellow oil of Ph$_2$Si(Me$_4$CpH)Cl in 13.5 g (99.0%) yield. $^1$H NMR (400 MHz, C$_6$D$_6$): δ 1.58 (6H, s, Cp-CH$_3$), 1.81 (6H, s, Cp-CH$_3$), 3.53 (1H, bs, Cp-CH), 7.07-7.14 (6H, m, Ar—CH), 7.57-7.60 (4H, m, Ar—CH) ppm.

Synthesis of Diphenylsilyl-(2,3,4,5-tetramethyl-2,4-cyclopentadien-1-yl)(trifluoromethanesulfonate), Ph$_2$Si(Me$_4$CpH)(OTf)

A neat Ph$_2$Si(Me$_4$CpH)Cl (8.46 g, 25.0 mmol) was dissolved in 200 mL of DCM and cooled to −25° C., and to this a solid silver trifluoromethanesulfonate (6.413 g, 25.0 mmol) was added over a period of 10-15 minutes. The resulting mixture was covered with aluminum foil and stirred overnight at room temperature. Insoluble byproduct AgCl was filtered out and volatiles from the filtrate were removed in vacuo to afford an orange semisolid of Ph$_2$Si(Me$_4$CpH)(OTf) in 10.3 g (91.1%) yield. $^1$H NMR (400 MHz, C$_6$D$_6$): δ 1.47 (6H, s, Cp-CH$_3$), 1.94 (6H, s, Cp-CH$_3$), 3.76 (1H, bs, Cp-CH), 7.12-7.14 (2H, m, Ar—CH), 7.20-7.24 (4H, m, Ar—CH), 7.60-7.65 (4H, m, Ar—CH) ppm.

Synthesis of Diphenylsilyl-(2,3,4,5-tetramethyl-2,4-cyclopentadien-1-yl)(trimethylsilylmethylcyclopentadiene), Ph$_2$Si(Me$_4$CpH)(Me$_3$SiCH$_2$CpH)

A solid Me$_3$SiCH$_2$CpLi (519 mg, 3.28 mmol) was added to a precooled ethereal solution of Ph$_2$Si(Me$_4$CpH)(OTf) (1.486 g, 3.28 mmol) at −25° C. The resulting mixture was stirred overnight at room temperature to ensure completion of the reaction. Volatiles from the reaction mixture were removed in vacuo and subsequently triturated with pentane. The crude materials were extracted into pentane and followed by solvent removal under reduced pressure afforded a thick yellow oil of Ph$_2$Si(Me$_4$CpH)(Me$_3$SiCH$_2$CpH) in 1.46 g (97.9%) yield. $^1$H NMR (400 MHz, C$_6$D$_6$): δ −0.13-0.08 (9H, m, SiMe$_3$-CH$_3$), 1.61-1.98 (14H, m, Cp-CH$_3$ and Me$_3$Si—CH$_2$), 3.67 (1H, bs, Cp-CH), 4.15 (1H, bs, Cp-CH), 5.76-6.70 (3H, m, Cp-CH), 7.25-7.31 (6H, m, Ar—CH), 7.50-7.55 (1H, m, Ar—CH), 7.70-7.74 (1H, m, Ar—CH), 7.81-7.89 (2H, m, Ar—CH) ppm.

Synthesis of Lithium diphenylsilyl-(tetramethylcyclopentadienide)-(trimethylsilylmethylcyclopentadienide), Ph$_2$Si(Me$_4$Cp)(Me$_3$SiCH$_2$Cp)Li$_2$ A hexane solution of n-butyl lithium (2.6 mL, 6.5 mmol, 2.5 M solution) was added drop wise to a precooled solution of Ph$_2$Si(Me$_4$CpH)(Me$_3$SiCH$_2$CpH) (1.46 g, 3.2 mmol) in 30 mL of diethyl ether over a period of 5-10 minutes at −25° C. The resulting mixture was gradually warmed to room temperature and then continuously stirred overnight. Volatiles from the reaction mixture were removed in vacuo, and triturated with pentane. The crude materials were thoroughly washed with pentane to remove any soluble impurities, and dried under vacuum to obtain the colorless crystalline solid of Ph$_2$Si(Me$_4$Cp)(Me$_3$SiCH$_2$Cp)Li$_2$ in 1.40 g (93.8%) yield. $^1$H NMR (400 MHz, THF-d$_8$): δ −0.04 (9H, s, SiMe$_3$-CH$_3$), 1.62 (4H, s, Cp-CH$_3$), 1.69 (2H, s, Me$_3$Si—CH$_2$), 1.73 (2H, s, Cp-CH$_3$), 1.94 (6H, s, Cp-CH$_3$), 5.61 (1H, t, J$_{HH}$=2.6 Hz, Cp-CH), 5.73 (1H, t, J$_{HH}$=2.2 Hz, Cp-CH), 5.84 (1H, t, J$_{HH}$=2.6 Hz, Cp-CH), 7.07-7.11 (4H, m, Ar—CH), 7.19-7.23 (2H, m, Ar—CH), 7.53-7.56 (1H, m, Ar—CH), 7.65-7.70 (3H, m, Ar—CH) ppm.

Synthesis of Diphenylsilyl-(tetramethylcyclopentadienide)-(trimethylsilylmethylcyclopentadienide) hafnium dichloride, Ph$_2$Si(Me$_4$Cp)-(Me$_3$SiCH$_2$Cp)HfCl$_2$ A solid HfCl$_4$ (960 mg, 3.0 mmol) was added to a precooled ethereal (10 mL) solution of Ph$_2$Si(Me$_4$Cp) (Me$_3$SiCH$_2$Cp)Li$_2$ (1.40 mg, 3.0 mmol) at −25° C. The resulting mixture was stirred overnight at room temperature. Insoluble materials were filtered out and volatiles from the filtrate were removed in vacuo. The crude materials were washed with cold pentane to remove soluble impurities. The resulting materials were dried under vacuum to obtain the pale yellow crystalline solid of Ph$_2$Si(Me$_4$Cp)(Me$_3$SiCH$_2$Cp)HfCl$_2$ in 2.0 g (95.0%) yield. $^1$H NMR (400 MHz, CD$_2$Cl$_2$): δ−0.06 (9H, s, SiMe$_3$-CH$_3$), 1.52 (3H, s, Cp-CH$_3$), 1.58 (3H, s, Cp-CH$_3$), 2.03 (3H, s, Cp-CH$_3$), 2.08 (3H, s, Cp-CH$_3$), 2.18 (2H, bs, Me$_3$Si—CH$_2$), 5.25 (1H, t, J$_{HH}$=2.2 Hz, Cp-CH), 5.82 (1H, t, J$_{HH}$=2.6 Hz, Cp-CH), 6.47 (1H, t, J$_{HH}$=2.2 Hz, Cp-CH), 7.44-7.48 (6H, m, Ar—CH), 7.94-8.01 (4H, m, Ar—CH) ppm.

Synthesis of Complex 2, Diphenylsilyl-(tetramethylcyclopentadienide) (trimethylsilylmethylcyclopentadienide) hafnium dimethyl, Ph$_2$Si(Me$_4$Cp)(Me$_3$SiCH$_2$Cp)HfMe$_2$ An ethereal solution of MeMgBr (3.63 mL, 5.8 mmol) was added drop wise to a precooled diethyl ether solution of Ph$_2$Si(Me$_4$Cp)(Me$_3$SiCH$_2$Cp)HfCl$_2$ (2.0 g, 2.85 mmol) over a period of 5-10 minutes at −25° C. The resulting mixture was stirred overnight at room temperature to ensure completion of the reaction. Volatiles were removed in vacuo, and the crude materials were then extracted into pentane. Solvent removal afforded an off-white crystalline material of Ph$_2$Si(Me$_4$Cp)(Me$_3$SiCH$_2$Cp)HfMe$_2$ in 1.2 g (63.6%) yield. $^1$H NMR (400 MHz, C$_6$D$_6$): δ −0.41 (3H, s, Hf—CH$_3$), −0.38 (3H, s, Hf—CH$_3$), 0.15 (9H, s, SiMe$_3$-CH$_3$), 1.52 (3H, s, Cp-CH$_3$), 1.55 (3H, s, Cp-CH$_3$), 2.03 (3H, s, Cp-CH$_3$), 2.04 (3H, s, Cp-CH$_3$), 2.11 (2H, bs, Me$_3$Si—CH$_2$), 5.36 (1H, t, J$_{HH}$=2.2 Hz, Cp-CH), 5.69 (1H, t, Jr/H=2.6 Hz, Cp-CH), 6.48 (1H, t, J$_{HH}$=2.2 Hz, Cp-CH), 7.19-7.23 (6H, m, Ar—CH), 7.96-8.07 (4H, m, Ar—CH) ppm.

Supported Catalyst A (Comparative)

Supported (nPrCp)$_2$HfMe$_2$ was made according to the general procedures described in U.S. Pat. No. 7,179,876 using a methylalumoxane treated silica (SMAO-ES70-875C) prepared as follows: In a 4 L stirred vessel in the drybox methylaluminoxane (MAO) (30 wt % in toluene) was added along with 2400 g of toluene. This solution was then stirred at 60 RPM for 5 minutes. Next, ES70™ silica (PQ Corporation, Conshohocken, Pa.) that had been calcined at 875° C. was added to the vessel. This slurry was heated at 100° C. and stirred at 120 RPM for 3 hours. The temperature was then lowered to 25° C. and cooled to temperature over 2 hours. Once cooled, the vessel was set to 8 RPM and placed under vacuum for 72 hours. After emptying the vessel and sieving the supported MAO, 1079 g was collected.

Supported Catalyst B

In a nitrogen filled drybox under constant purge, a 0.45 gram amount of SMAO-ES70-875C was added to a Celstir™ flask with 20 mL toluene. A 6.9 mg (18 μmop amount of (1-Me-Ind)(Me$_5$Cp)ZrMe$_2$ and a 9.6 mg (18 μmop amount of Complex 1 were added to the slurry and stirred for two hours. The slurry was filtered, the solids were rinsed a 10 mL portion of toluene and two 10 mL portions of hexane, and dried under vacuum. A 0.35 g amount of light yellow silica was collected.

Supported Catalyst C

In a nitrogen filled drybox under constant purge, a 0.45 gram amount of SMAO-ES70-875C was added to a Celstir™ flask with 20 mL toluene. A 6.8 mg (18 μmol) amount of rac/meso(1-Me-Ind)$_2$ZrMe$_2$ (rac/meso ratio of 1:1) and a 9.6 mg (18 μmol) amount of Complex 1 was added to the slurry and stirred for three hours. The slurry was filtered, the solids were rinsed a 10 mL portion of toluene and two 10 mL portions of hexane, and dried under vacuum. A 0.34 g amount of light yellow silica was collected.

Supported Catalyst D

In a nitrogen filled drybox under constant purge, a 1.0 g amount of SMAO ES-70 875C was slurried in approximately 10 mL of toluene using a Celstir™ flask. Next, 15.8 mg (32 μmol) of Complex 3 (Me$_2$Si(Me$_4$Cp)(n-Pr-Cp)HfMe$_2$) and 3.1 mg (8 μmol) of (1-Me-Ind)(Me$_5$Cp)ZrMe$_2$ were added to the Celestir™ vessel from stock solutions (1 mg/g toluene). This mixture was stirred for three hours, after which the mixture was filtered using a glass frit. It was washed with two 10 mL portions of hexane and then dried under vacuum for 3 hrs. The yield was 0.87 g of white powder.

Supported Catalyst E

In a nitrogen filled drybox under constant purge, a 1.0 g amount of SMAO-ES70-875C was slurried in approximately 10 mL of toluene using a Celstir™ flask. Next, 19.4 mg (32 μmol) of Complex 4 Me$_2$Si(2-Me, 3-n-Pr-Ind)$_2$HfMe$_2$ and 3.1 mg (8 μmol) of (1-Me-Ind)(Me$_5$Cp)ZrMe$_2$ were added to the Celestir™ vessel from stock solutions (1 mg/g toluene). This mixture was stirred for three hours, after which the mixture was filtered using a glass frit. It was washed with two 10 mL portions of hexane and then dried under vacuum for 3 hrs. The yield was 0.92 g of light yellow powder.

Supported Catalyst F

In a nitrogen filled drybox under constant purge, a 0.45 gram amount of SMAO-ES70-875C was added to a Celstir™ flask with 20 mL toluene. A 6.8 mg (18 μmol) amount of rac/meso(1-Me-Ind)$_2$ZrMe$_2$ [rac/meso ratio: 1:1] and a 9.6 mg (18 μmol) amount of Complex 2 was added to the slurry and stirred for three hours. The slurry was filtered, the solids were rinsed a 10 mL portion of toluene and two 10 mL portions of hexane, and dried under vacuum. A 0.34 g amount of light yellow silica was collected.

Supported Catalyst G

A 1.0 g amount of SMAO-ES70-875C was stirred in 10 mL of toluene using a Celstir™ flask. rac/meso(1-Me-Ind)$_2$ZrMe$_2$ (17 mg, 40 μmol) was added to the slurry and stirred for three hours. The mixture was filtered, washed with several 10 mL portions of hexane and then dried under vacuum, yielding 0.95 g of white silica.

Supported Catalyst H

A 1.0 g amount of SMAO-ES70-875C was stirred in 10 mL of toluene using a Celstir™ flask. rac/meso(1-Ethyl-Ind)$_2$ZrMe$_2$ (18 mg, 40 μmol) was added to the slurry and stirred for three hours. The mixture was filtered, washed with several 10 mL portions of hexane and then dried under vacuum, yielding 0.90 g of white silica.

Supported Catalyst I

A 1.0 g amount of SMAO-ES70-875C was stirred in 10 mL of toluene using a Celstir™ flask. rac/meso(1-Ethyl-Ind)$_2$ZrMe$_2$ (18 mg, 40 μmol) was added to the slurry and stirred for three hours. The mixture was filtered, washed with several 10 mL portions of hexane and then dried under vacuum, yielding 0.94 g of white silica.

Supported Catalyst J

A 1.0 g amount of SMAO-ES70-875C was stirred in 10 mL of toluene using a Celstir™ flask. Dimethylsilyl (trimethylsilylmethyl-cyclopentadienide)(tetramethyl-cyclopentadienide)hafnium(IV) dimethyl (21.2 mg, 40 μmol) was added to the slurry and stirred for three hours. The mixture was filtered, washed with several 10 mL portions of hexane and then dried under vacuum, yielding 0.81 g of white silica.

Polymerization with Supported Catalyst Systems

A 2 L autoclave was heated to 110° C. and purged with N$_2$ for at least 30 minutes. It was then charged with dry NaCl (350 g; Fisher, S271-10 dehydrated at 180° C. and subjected to several pump/purge cycles and finally passed through a 16 mesh screen prior to use) and SMAO-ES70-875C (5 g) at 105° C. and stirred for 30 minutes. The temperature was adjusted to 85° C. At a pressure of 2 psig N$_2$, dry, degassed 1-hexene (2.0 mL) was added to the reactor with a syringe then the reactor was charged with N$_2$ to a pressure of 20 psig. A mixture of H2 and N$_2$ was flowed into reactor (200 square centimeter per minute flow rate; 10% H2 in N$_2$) while stirring the bed.

Thereafter, the catalysts indicated in Table 1 were injected into the reactor with ethylene at a pressure of 220 psig; ethylene flow was allowed over the course of the run to maintain constant pressure in the reactor. 1-hexene was fed into the reactor as a ratio to ethylene flow (0.1 g/g). Hydrogen was fed to the reactor as a ratio to ethylene flow (0.5 mg/g). The hydrogen and ethylene ratios were measure by on-line GC analysis. Polymerizations were halted after 1 hour by venting the reactor, cooling to room temperature then exposing to air. The salt was removed by washing with water two times; the polymer was isolated by filtration, briefly washed with acetone and dried in air for at least for two days.

TABLE 1

Slurry Phase Polymerization of Ethylene and 1-Hexene

| Ex. | Supported Catalyst// Catalyst Complex | MI dg/min | MIR | Mw g/mol | Mn g/mol | Mw/Mn | Hexene wt % | Activity gP/gsup cat. | g'(vis) | Mz | 2Mz/ (Mw + Mn) |
|---|---|---|---|---|---|---|---|---|---|---|---|
| 1 | A// (nPrCp)$_2$HfMe$_2$ | 1.23 | 30 | 102,605 | 34,368 | 2.99 | 11.08 | 8000 | 0.984 | 179343 | 2.62 |
| 2 | B//1 | 0.347 | 80.84 | 113,443 | 19,255 | 5.89 | 10.86 | 10109 | 0.963 | 250717 | 3.78 |
| 3 | C//1 | 2.39 | 45.7 | 88,067 | 15,274 | 5.77 | 9.03 | 7761 | 0.925 | 242077 | 4.69 |
| 4 | D//3 | 1.45 | 23.1 | 100,557 | 29,174 | 3.45 | 11.88 | 10980 | 0.992 | 189916 | 2.93 |
| 5 | E//3 | 0.54 | 28.6 | 121,437 | 33,134 | 3.67 | 10.90 | 4129 | 0.931 | 199952 | 2.59 |
| 6 | F//2 | 1.2 | 38 | 90,326 | 16,157 | 5.59 | 8.36 | 4202 | 0.963 | 217953 | 4.09 |

TABLE 2

4D GPC Measurement of Hexene from Low Mw to High Mw

| Example | Supported Catalyst//Catalyst Complex | Hexene (wt %) | RCI, m (kg/mol) | CDR2, m | $T_{75}$-$T_{25}$ (° C.) |
|---|---|---|---|---|---|
| 1 | A//(nPrCp)$_2$HfMe$_2$ | 11.1 | 52.0 | 1.23 | 20.96 |
| 2 | B//1 | 10.9 | 159.7 | 1.65 | 35.03 |
| 3 | C//1 | 9.0 | 188.7 | 3.03 | 26.07 |
| 4 | D//3 | 11.9 | 42.3 | 1.17 | 17.44 |
| 5 | E//3 | 10.9 | 38.7 | 1.08 | 18.72 |
| 6 | F//2 | 8.4 | 102.6 | 2.00 | 25.91 |

Figure 4:
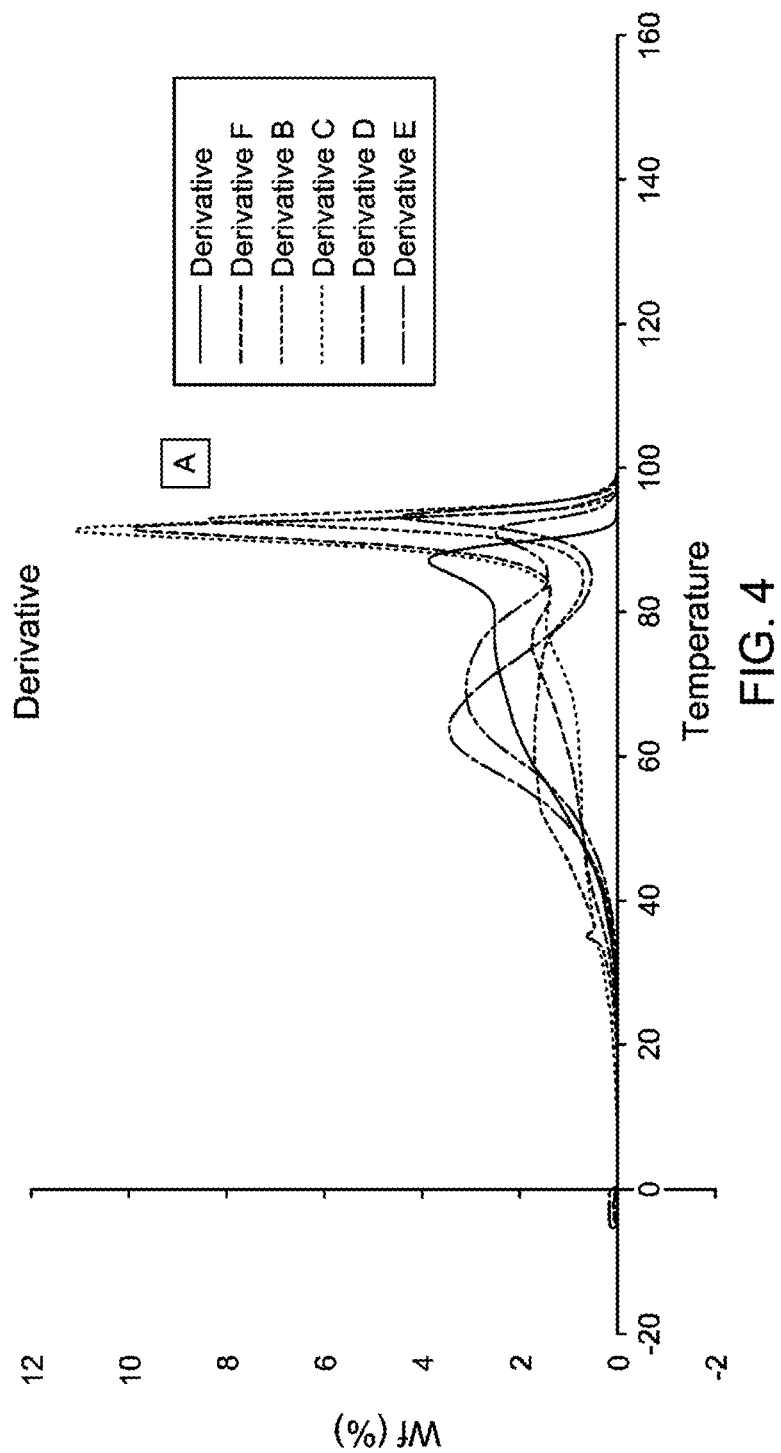
FIG. 4 is a TREF graph of examples 1-6 in Table 2.

A TREF overlay for Examples 1 to 6 in Table 2 is presented in FIG. 4. Example 1, referred to as derivative A (gray line), and Examples 2-6, referred to as derivatives B to F, respectively, show increased composition distribution spread for Examples 5 and 6 (derivatives E and F).

Additional Slurry phase polymerizations were conducted as described above. Data are presented in Table 3.

TABLE 3

Ethylene Hexene Polymerization

| Ex | H2 Charge | Prod. (g/g cat) | Mw (g/mol) | Mn (g/mol) | Mw/Mn | RCI, w (kg/mol) | RCI, m (kg/mol) | Hexene (wt %) | g' (vis avg.) | $T_{75}$-$T_{25}$ (° C.) |
|---|---|---|---|---|---|---|---|---|---|---|
| 7 (supported Catalyst G) | 120 | 2019 | 57,075 | 14,160 | 4.03 | −0.1 | −2 | 2.30 | 1.062 | 2.24 |
| 8 (supported Catalyst H) | 120 | 1183 | 98,972 | 15,258 | 6.49 | −0.1 | −3.3 | 2.19 | 0.960 | 4.48 |

TABLE 3-continued

| | | | | | Ethylene Hexene Polymerization | | | | | |
|---|---|---|---|---|---|---|---|---|---|---|
| Ex | H2 Charge | Prod. (g/g cat) | Mw (g/mol) | Mn (g/mol) | Mw/Mn | RCI, w (kg/mol) | RCI, m (kg/mol) | Hexene (wt %) | g' (vis avg.) | $T_{75}$-$T_{25}$ (° C.) |
| 9 (supported Catalyst I) | 150 | 1809 | 53,991 | 12,538 | 4.31 | −0.2 | −5.6 | 6.95 | 0.966 | 18.5* |
| 10 (supported Catalyst J) | 120 | 11,210 | 78,369 | 19,821 | 3.95 | 0.6 | 25.5 | 12.55 | 0.992 | 25.91 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "I" preceding the recitation of the composition, element, or elements and vice versa, e.g., the terms "comprising," "consisting essentially of," "consisting of" also include the product of the combinations of elements listed after the term.

The invention claimed is:

1. A supported catalyst system comprising: a bridged group 4 metallocene compound; an unbridged metallocene compound; a support material; and an activator, wherein the bridged group 4 metallocene compound is represented by the formula (A):

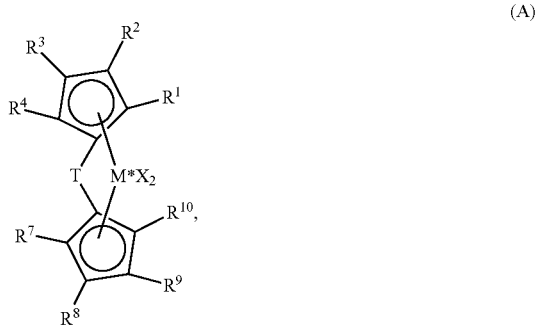

(A)

wherein:
M* is a group 4 metal,
each $R^1$, $R^2$, and $R^4$ is independently hydrogen, an alkoxide, or a $C_1$ to $C_{40}$ substituted or unsubstituted hydrocarbyl group,
$R^3$ is independently hydrogen, an alkoxide, a $C_1$ to $C_{40}$ substituted or unsubstituted hydrocarbyl group, or a —$R^{20}$—$SiR'_3$ or —$R^{20}$—$CR'_3$ group, wherein $R^{20}$ is a $C_1$ to $C_4$ hydrocarbyl group and each R' is independently hydrogen or a $C_1$ to $C_{20}$ substituted or unsubstituted hydrocarbyl group provided that at least one R' is not hydrogen, each $R^7$, $R^8$, and $R^{10}$ is independently hydrogen, a halide, an alkoxide, or a $C_1$ to $C_{40}$ substituted or unsubstituted hydrocarbyl group,
$R^9$ is a —$R^{20}$—$SiR'_3$ group,
T is a bridging group, and
each X is, independently, a univalent anionic ligand, or two Xs are joined and bound to the metal atom to form a metallocycle ring, or two Xs are joined to form a chelating ligand, a diene ligand, or an alkylidene ligand, provided that the bridged metallocene is not symmetrically substituted, and wherein the unbridged metallocene compound is represented by the formula (B):

$$Cp_mMX_q \qquad (B),$$

wherein:
each Cp is, independently, a substituted or unsubstituted cyclopentadienyl group,
M is zirconium or hafnium,
X is a leaving group,
m=2 or 3,
q=0, 1, 2, or 3,
m+q is equal to the oxidation state of M, and
each Cp and X is bound to M.

2. The supported catalyst system according to claim 1, wherein M* is hafnium or zirconium, each $R^1$, $R^2$, $R^3$, and $R^4$ is a $C_1$ to $C_{20}$ alkyl group and $R^9$ is a —$R^{20}$—$SiR'_3$ group wherein $R^{20}$ is $CH_2$, and each R' is independently a $C_1$ to $C_{20}$ alkyl group or a $C_1$ to $C_{20}$ aryl group.

3. The supported catalyst system according to claim 1, wherein M in formula B is zirconium and $R^9$ is —$R^{20}$—$SiR'_3$ wherein $R^{20}$ is $CH_2$, and each R' is independently a $C_1$ to $C_{20}$ alkyl group or a $C_1$ to $C_{20}$ aryl group. The supported catalyst system according to claim 1, wherein M in formula B is Zr and $R^9$ is —$R^{20}$—$SiR'_3$ or —$R^{20}$—$CR'_3$ where $R^{20}$ is $CH_2$, and R' is a $C_1$ to $C_{20}$ alkyl or aryl 4. The supported catalyst system according to claim 1, wherein the bridged metallocene compound is one or more of: $SiMe_2(Me_4Cp)(3-nPrCp)HfMe_2$; $SiPh_2(Me_4Cp)(3-nPrCp)HfMe_2$; $Me_2Ge(Me_4Cp)(3-nPrCp)HfMe_2$; $Ph_2Ge(Me_4Cp)(3-nPrCp)HfMe_2$; $PhMeSi(Me_4Cp)(3-nPrCp)HfMe_2$; $Et_2Si(Me_4Cp)(3-nPrCp)HfMe_2$; $SiMe_2(EtMe_3Cp)(3-nPrCp)HfMe_2$; $SiMe_2(Me_4Cp)(3-nBuCp)HfMe_2$; $SiPh_2(Me_4Cp)(3-nBuCp)HfMe_2$; $Me_2Ge(Me_4Cp)(3-nBuCp)HfMe_2$; $Ph_2Ge(Me_4Cp)(3-nBuCp)HfMe_2$; $PhMeSi(Me_4Cp)(3-nBuCp)HfMe_2$; $Et_2Si(Me_4Cp)(3-nBuCp)HfMe_2$; $SiMe_2(EtMe_3Cp)(3-nBuCp)HfMe_2$; $SiMe_2(Me_4Cp)(3-CH_2—SiMe_3-Cp)HfMe_2$; $SiPh_2(Me_4Cp)(3-CH_2—SiMe_3-Cp)HfMe_2$; $Me_2Ge(Me_4Cp)(3-CH_2—SiMe_3-Cp)HfMe_2$; $Ph_2Ge(Me_4Cp)(3-CH_2—SiMe_3-Cp)HfMe_2$; $PhMeSi(Me_4Cp)(3-CH_2—SiMe_3-Cp)HfMe_2$; $Et_2Si(Me_4Cp)(3-CH_2—SiMe_3-Cp)HfMe_2$; $SiMe_2(EtMe_3Cp)(3-CH_2—SiMe_3-Cp)HfMe_2$; $SiMe_2(Me_4Cp)(3-CH_2—SiPhMe_2-Cp)HfMe_2$; $SiPh_2(Me_4Cp)(3-CH_2—SiPhMe_2-Cp)HfMe_2$; $Me_2Ge(Me_4Cp)(3-CH_2—SiPhMe_2)HfMe_2$; $Ph_2Ge(Me_4Cp)(3-CH_2—$ SiPhMe₂)HfMe₂; PhMeSi(Me₄Cp)(3-CH₂—SiPhMe₂-Cp)HfMe₂; Et₂Si(Me₄Cp)(3-CH₂—SiPhMe₂-Cp)HfMe₂; SiMe₂(EtMe₃Cp)(3-CH₂—SiPh₃-Cp)HfMe₂; SiMe₂(Me₄Cp)(3-CH₂—SiPh₃-Cp)HfMe₂, SiPh₂(Me₄Cp)(3-CH₂—SiPh₃-Cp)HfMe₂; Me₂Ge(Me₄Cp)(3-CH₂—SiPh₃)HfMe₂, Ph₂Ge(Me₄Cp)(3-CH₂—SiPh₃)HfMe₂; PhMeSi(Me₄Cp)(3-CH₂—SiPh₃-Cp)HfMe₂; Et₂Si(Me₄Cp)(3-CH₂—SiPh₃-Cp)HfMe₂; SiMe₂(EtMe₃Cp)(3-CH₂—SiPh₃-Cp)HfMe₂; SiMe₂(2-Me, 3-n-Pr-Ind)₂HfMe₂; SiPh₂(2-Me, 3-n-Pr-Ind)₂HfMe₂; GeMe₂(2-Me, 3-n-Pr-Ind)₂HfMe₂; GePh₂(2-Me, 3-n-Pr-Ind)₂HfMe₂; SiPhMe(2-Me, 3-n-Pr-Ind)₂HfMe₂; Et₂Si(2-Me, 3-n-Pr-Ind)₂HfMe₂; SiMe₂(2-Me, 3-n-Bu-Ind)₂HfMe₂; SiPh₂(2-Me, 3-n-Bu-Ind)₂HfMe₂; GeMe₂ (2-Me, 3-n-Bu-Ind)₂HfMe₂; GePh₂(2-Me, 3-n-Bu-Ind)₂HfMe₂; SiPhMe(2-Me, 3-n-Bu-Ind)₂HfMe₂; Et₂Si(2-Me, 3-n-Bu-Ind)₂HfMe₂; SiMe₂ (2-Me,3-CH₂—SiMe₃-Ind)₂HfMe₂; SiPh₂(2-Me,3-CH₂—SiMe₃-Ind)₂HfMe₂; GeMe₂(2-Me,3-CH₂—SiMe₃-Ind)₂HfMe₂; GePh₂ (2-Me,3-CH₂—SiMe₃-Ind)₂HfMe₂; SiPhMe(2-Me,3-CH₂—SiMe₃-Ind)₂HfMe₂; Et₂Si(2-Me,3-CH₂—SiMe₃-Ind)₂HfMe₂; SiMe₂(2-Me,3-CH₂—SiPhMe₂-Ind)₂HfMe₂; SiPh₂(2-Me,3-CH₂—SiPhMe₂-Ind)₂HfMe₂; GeMe₂ (2-Me,3-CH₂—SiPhMe₂-Ind)₂HfMe₂; GePh₂(2-Me,3-CH₂—SiPhMe₂-Ind)₂HfMe₂; SiPhMe(2-Me,3-CH₂—SiPhMe₂-Ind)₂HfMe₂; Et₂Si(2-Me,3-CH₂—SiPhMe₂-Ind)₂HfMe₂; SiMe₂(2-Me,3-CH₂—SiPh₃-Ind)₂HfMe₂; SiPh₂ (2-Me,3-CH₂—SiPh₃-Ind)₂HfMe₂; GeMe₂ (2-Me,3-CH₂—SiPh₃-Ind)₂HfMe₂; GePh₂ (2-Me,3-CH₂—SiPh₃-Ind)₂HfMe₂; SiPhMe (2-Me,3-CH₂—SiPh₃-Ind)₂HfMe₂; Et₂Si(2-Me,3-CH₂—SiPh₃-Ind)₂HfMe₂, and the alkyl or halide versions thereof, wherein the Me₂ is substituted with Et₂, Cl₂, Br₂, I₂, or Ph₂.

5. The supported catalyst system according to claim 1, wherein the unbridged metallocene compound is represented by the formula $Cp^A Cp^B ZrX'_n$, wherein each $Cp^A$ and $Cp^B$ is independently selected from the group consisting of cyclopentadienyl ligands and ligands isolobal to cyclopentadienyl, either or both $Cp^A$ and $Cp^B$ optionally contains heteroatoms, and either or both $Cp^A$ and $Cp^B$ is optionally substituted; each X' is independently a leaving group, and n is 0, 1, or 2.

6. The supported catalyst system according to claim 1, wherein the unbridged metallocene compound is selected from the group consisting of: bis(cyclopentadienyl)zirconium dichloride, bis(cyclopentadienyl)zirconium dimethyl, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-phenylcyclopentadienyl)zirconium dichloride, bis(1-methyl-3-phenylcyclopentadienyl)zirconium dimethyl, bis(1-methyl-3-n-butylcyclopentadienyl)hafnium dichloride, bis(1-methyl-3-n-butylcyclopentadienyl)zirconium dimethyl, bis(indenyl)zirconium dichloride, bis(indenyl)zirconium dimethyl, bis(tetrahydro-1-indenyl)zirconium dichloride, bis(tetrahydro-1-indenyl)zirconium dimethyl, (n-propyl cyclopentadienyl)(pentamethyl cyclopentadienyl)zirconium dichloride, (n-propyl cyclopentadienyl)(pentamethyl cyclopentadienyl)zirconium dimethyl, rac/meso-(1-ethylindenyl)zirconium dichloride, rac/meso-(1-ethylindenyl)zirconium dimethyl, rac/meso-(1-methylindenyl)zirconium dichloride, rac/meso-(1-methylindenyl)zirconium dimethyl, rac/meso-(1-propylindenyl)zirconium dichloride, rac/meso-(1-propylindenyl)zirconium dimethyl, rac/meso-(1-butylindenyOzirconium dichloride, rac/meso-(1-butylindenyOzirconium dimethyl, meso-(1ethylindenyl)zirconium dichloride, meso-(1ethylindenyl) zirconium dimethyl, (1-methylindenyl)(pentamethyl cyclopentadienyl) zirconium dichloride, and (1-methylindenyl)(pentamethyl cyclopentadienyl) zirconium dimethyl.

7. The supported catalyst system according to claim 1, wherein the support material has a surface area in the range of from 10 m²/g to 700 m²/g and an average particle diameter in the range of from 10 µm to 500 µm.

8. The supported catalyst system according to claim 1, wherein the support material is selected from the group consisting of silica, alumina, silica-alumina, and combinations thereof.

9. The supported catalyst system according to claim 1, wherein the support material is fluorided.

10. The supported catalyst system of claim 9, wherein the support material has a fluorine concentration in the range of 0.6 wt % to 3.5 wt %, based upon the weight of the support material.

11. The supported catalyst system according to claim 1, wherein the activator comprises alumoxane, a non-coordinating anion, or a combination thereof.

12. The supported catalyst system according to claim 1, wherein the unbridged metallocene compound represented by formula B is present in the catalyst system as at least two isomers.

13. The supported catalyst system according to claim 1, wherein the activator comprises one or more of: N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis (perfluorophenyl)borate, [Me₃NH⁺][B(C₆F₅)₄—], 1-(4-(tris(pentafluoropheny Oborate)-2,3,5,6-tetrafluorophenyl) pyrrolidinium; [Me₃NH⁺][B(C₆F₅)₄—], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, 4-(tris (pentafluorophenyl)borate)-2,3,5,6-tetrafluoropyridinium, solidium tetrakis(perfluorophenyl)aluminate, potassium tetrakis(pentafluorophenyl), and N,N-dimethylanilinium tetrakis(perfluorophenyl)aluminate.

14. A process for polymerization of olefin monomers comprising contacting one or more monomers with the supported catalyst system of claim 1 to produce a polymer.

15. The process according to claim 14, wherein a reactivity of the bridged group 4 metallocene compound to hydrogen is different that a reactivity of the unbridged metallocene compound to hydrogen.

16. The process according to claim 14, wherein the olefin monomers comprise ethylene and one or more comonomers selected from the group consisting of propylene, 1-butene, 1-pentene, 3-methyl-1-pentene, 4-methyl-1-pentene, 1-hexene, 1-octene, 1-decene, and combinations thereof.

17. The process according to claim 14, wherein the polymerization is carried out in a slurry polymerization process or a gas phase polymerization process.

18. The process of claim 14, wherein the olefin monomers comprise ethylene and one or more comonomers, and wherein the polymer produced by the process has: 1) an RCI,m of greater than 30, and an Mw/Mn of greater than 3 and less than 5, and optionally a $T_{75}$-$T_{25}$ of 15° C. to 20° C.;

or 2) an RCI,m of greater than 50, and an Mw/Mn of greater than 5, and optionally a $T_{75}$-$T_{25}$ of 25° C. to 45° C.

19. The process of claim 14, wherein:
1) when the bridged group 4 metallocene compound (A) is run under the same polymerization conditions as a supported catalyst composition comprising (A) and (B), except that the unbridged metallocene compound (B) is absent, a polymer having an RCI,m of 20 or more is produced, and
2) when the unbridged metallocene compound (B) is run under the same polymerization conditions as step 1), except that the bridged group 4 metallocene compound (A) is absent, a polymer having an RCI,m of less than zero is produced.

20. A process to produce linear low density polyethylene comprising contacting one or more monomers with the supported catalyst system of claim 1, wherein:
1) when the bridged group 4 metallocene catalyst compound (A), the unbridged metallocene catalyst compound (B), and the activator are supported on the same support material and run under the polymerization conditions, an ethylene polymer is produced having: a) an RCI,m of greater than 30 and an Mw/Mn of greater than 3 and less than 5; or b) an RCI,m of greater than 50 and an Mw/Mn of greater than 5;
2) when the supported bridged group 4 metallocene catalyst compound (A) is run under the same polymerization conditions of step 1) except that the unbridged metallocene catalyst compound (B) is absent, an ethylene polymer is produced having an RCI,m of greater than 20; and
3) when the supported unbridged metallocene catalyst compound (B) is run under the same polymerization conditions of step 1) except that the bridged group 4 metallocene catalyst compound (A) is absent, an ethylene polymer is produced having a negative RCI,m.

21. The supported catalyst system according to claim 1, wherein $R^9$ is —$R^{20}$—SiR'$_3$, and wherein $R^{20}$ is $CH_2$ and each R' is independently a $C_1$ to $C_{20}$ alkyl group or a $C_1$ to $C_{20}$ aryl group.

22. The supported catalyst system according to claim 1, wherein the bridged A group 4 metallocene compound is one or more of: SiMe$_2$(Me$_4$Cp)(3-CH$_2$— SiMe$_3$-Cp)HfMe$_2$; SiPh$_2$(Me$_4$Cp)(3-CH$_2$—SiMe$_3$-Cp)HfMe$_2$; alkyl versions thereof, wherein the Me$_2$ is substituted with Et$_2$ or Ph$_2$, and halide versions thereof, wherein the Me$_2$ is substituted with Cl$_2$, Br$_2$, or I$_2$.

23. The supported catalyst system according to claim 1, wherein the bridged group 4 metallocene compound comprises SiMe$_2$(Me$_4$Cp)(3-nPrCp)HfMe$_2$, SiMe$_2$(Me$_4$Cp)(3-CH$_2$—SiMe$_3$-Cp)HfMe$_2$, SiPh$_2$(Me$_4$Cp)(3-CH$_2$—SiMe$_3$-Cp)HfMe$_2$, SiMe$_2$(2-Me, 3-n-Pr-Ind)$_2$HfMe$_2$, or a combination thereof.

* * * * *